(12) United States Patent
Perlman et al.

(10) Patent No.: US 8,194,093 B2
(45) Date of Patent: Jun. 5, 2012

(54) APPARATUS AND METHOD FOR CAPTURING THE EXPRESSION OF A PERFORMER

(75) Inventors: Stephen G. Perlman, Palo Alto, CA (US); Kenneth A. Pearce, San Francisco, CA (US); Tim S. Cotter, Sunnyvale, CA (US); Greg LaSalle, San Francisco, CA (US); John Speck, Sunnyvale, CA (US)

(73) Assignee: OnLive, Inc., Palo Alto, CA (US)

( * ) Notice: Subject to any disclaimer, the term of this patent is extended or adjusted under 35 U.S.C. 154(b) by 0 days.

(21) Appl. No.: 10/942,413

(22) Filed: Sep. 15, 2004

(65) Prior Publication Data

US 2006/0055699 A1     Mar. 16, 2006

(51) Int. Cl.
*G09G 5/02*     (2006.01)
(52) U.S. Cl. ......... 345/589; 345/420; 345/473; 345/581
(58) Field of Classification Search .................. None
See application file for complete search history.

(56) References Cited

U.S. PATENT DOCUMENTS

| | | | |
|---|---|---|---|
| 3,699,856 A | 10/1972 | Chabot et al. | |
| 3,805,238 A * | 4/1974 | Rothfjell | 382/118 |
| 5,227,985 A | 7/1993 | DeMenthon | |
| 5,235,416 A | 8/1993 | Stanhope | |
| 5,304,809 A | 4/1994 | Wickersheim | |
| 6,148,280 A | 11/2000 | Kramer | |
| 6,151,118 A | 11/2000 | Norita et al. | |
| 6,243,198 B1 | 6/2001 | Sedlmayr | |
| 6,473,717 B1 | 10/2002 | Claussen et al. | |
| 6,487,516 B1 | 11/2002 | Amorai-Moriya | |
| 6,513,921 B1 | 2/2003 | Houle | |
| 6,554,706 B2 | 4/2003 | Kim et al. | |
| 6,592,465 B2 | 7/2003 | Lutz et al. | |
| 6,633,294 B1 | 10/2003 | Rosenthal et al. | |
| 6,850,872 B1 * | 2/2005 | Marschner et al. | 703/2 |
| 6,943,949 B2 | 9/2005 | Sedlmayr | |
| 7,068,277 B2 | 6/2006 | Menache | |
| 7,081,997 B2 | 7/2006 | Sedlmayr | |
| 7,154,671 B2 | 12/2006 | Sedlmayr | |
| 7,218,320 B2 | 5/2007 | Gordon et al. | |
| 7,333,113 B2 | 2/2008 | Gordon | |
| 7,358,972 B2 | 4/2008 | Gordon et al. | |

(Continued)

FOREIGN PATENT DOCUMENTS

WO     WO 99/55220     11/1999

OTHER PUBLICATIONS

Graham, M., The Power of Texture: A New Approach for Surface Capture of the Human Hand, Apr. 30, 2004, Carnegie Mellon University Computer Science Department, pp. 1-23.*

(Continued)

*Primary Examiner* — Said Broome
(74) *Attorney, Agent, or Firm* — Blakely Sokoloff Taylor & Zafman LLP

(57) ABSTRACT

A method is described comprising: applying a series of curves on specified regions of a performer's face; tracking the movement of the series of curves during a motion capture session; and generating motion data representing the movement of the performer's face using the tracked movement of the series of curves.

21 Claims, 10 Drawing Sheets

U.S. PATENT DOCUMENTS

2005/0105772 A1    5/2005    Voronka et al.
2006/0077258 A1    4/2006    Allen et al.
2006/0203096 A1    9/2006    LaSalle et al.

OTHER PUBLICATIONS

Guskov, I., Klibanov, S., Bryant, B., Trackable Surfaces, Jul. 2003, SIGGRAPH 2003, pp. 251-257, 379.*

Parke, F., Computer Generated Animation of Faces, 1972, SIGGRAPH 1972, pp. 451-457.*

Scott, R., Sparking Life Notes on the Performance Capture Sessions for The Lord of the Rings: The Two Towers, Nov. 2003, ACM SIGGRAPH vol. 37 No. 4, pp. 17-21.*

Bascle, B., Blake, A., Separability of pose and expression in facial tracking and animation, 1998, IEEE Computer Society, Proceedings of the Sixth International Conference on Computer Vision, pp. 323-328.*

Pantic, M., Rothkrantz, L.J.M., Expert system for automatic analysis of facial expressions, Aug. 2000, Image and Vision Computing, vol. 18, pp. 881-905.*

Vicon, Vicon Motion Picture Ltd., 2 pgs., printed Feb. 25, 2005, www.vicon.com/jsp/index.jsp.

Vicon—Products, Vicon MX: System Overview, 2 pgs., printed Feb. 25, 2005, www.vicon.com/jsp/products/product-overview.jsp.

Vicon—Products, MX System: Cameras, "The Most Powerful, Practical and Versatile Range of Motion Capture Cameras," 1 pg., printed Feb. 25, 2005, www.vicon.com/jsp/products/product-category.jsp?cat=cameras.

Vicon, Vicon Motion Systems // MX3, MX3 Camera, The MX3 0.3 Million-pixel Motion Capture Camera, 2 pgs., printed on Feb. 25, 2005, www.vicon.com/jsp/products/product-detail.jsp?id=173.

Vicon, Vicon Motion Systems // MX13, MX13 Camera, The MX13 1.3 Million-pixel Motion Capture Camera, 2 pgs., printed on Feb. 25, 2005, www.vicon.com/jsp/products/prdouct-detail.jsp?id=170.

Vicon, Vicon Motion Systems // MX40, MX40 Camera, The MX40 4 Million-pixel Motion Capture Camera, 2 pgs., printed on Feb. 25, 2005, www.vicon.com/jsp/products/product-detail.jsp?id=167.

Vicon, Vicon motion Systems // SV Cam, 1 pg., printed on Feb. 25, 2005, www.vicon.com/jsp/products/product-detail.jsp?id+189.

Motion Analysis Corporation, The Motion Capture Leader, 1 pg., printed on Feb. 25, 2005, www.motionanalysis.com/.

MotionAnalysis, Video Game Products, Products, 1 pg., printed Feb. 25, 2005, www.motionanaylsis.com/applications/animation/games/produtcs.html.

MotionAnalysis, Eagle Digital System, 4 pgs., printed on Feb. 25, 2005, www.motionanalysis.com/applications/animation/games/eaglesystem.html.

MotionAnalysis, Hawk Digital System, 4 pgs., printed on Feb. 25, 2005, www.motionanalysis.com/applications/animation/games/hawksytem.html.

MotionAnalysis, Falcon Analog System, 4 pgs., printed on Feb. 25, 2005, www.motionanaylsis.com/applications/animation/games/falconsystem.html.

"PCT International Search Report and Written Opinion", PCT/US05/32418, (Feb. 19, 2008), 16 pages.

PCT/US2005/032418 Notification Concerning Transmittal of International Preliminary Report on Patentability; Written Opinion of the International Searching Authority, mailed Mar. 6, 2009, pp. 9.

Video Clips entitled Cam4Take2comp and 070306-Resolution Comparison-H264-small-no audio on a DVD (Dec. 7, 2009).

Video Clips entitled Cam4Take2comp and 070306-Resolution Comparison-H264-small-no audio on a CD (Dec. 7, 2009).

Coons, Steven A., "Surfaces for Computer-Aided Design of Space Forms", Jun. 1967, MAC-TR-41, Project MAC, Massachusetts Institute of Technology, 105 pgs.

Office Action from U.S. Appl. No. 10/942,609, mailed Jan. 5, 2010, 12 pgs.

P364XPCT, "Notification Concerning Transmittal of International Preliminary Report on Patentability and Written Opinion of the International Searching Authority", mailed Aug. 17, 2010, 8 pages.

Office Action from U.S. Appl. No. 10/942,609, mailed Sep. 14, 2011, 11 pgs.

"International Preliminary Report on Patentability and Written Opinion", International Preliminary Report on Patentability and Written Opinion of the International Searching Authority, mailed Dec. 15, 2011, 6 pages, PCT/US2010/037318, 1-6.

"PCT International Search Report and Written Opinion", International Preliminary Report on Patentability and Written Opinion of the International Searching Authority, mailed Apr. 28, 2011, 6 pages, PCT/US2006/006151, 1-6.

* cited by examiner

```
# Section 0:  parameters

# divisions per segment
DV 10
# Section 1: curve number, name and color

# Contours
C1  C_RBrow_1    F00   # red
C2  C_RBrow_2    0F0   # green
C3  C_RBrow_3    00F   # blue
# Radials
C4  R_RFHead_1   0FF   # cyan
C5  R_REye_1     F0F   # magenta
C6  R_REye_2     FF0   # yellow
# Section 2:  curve intersect list per curve

J1  4 5 6    # curve numbers
J2  4 5 6
J3  4 5 6
J4  1 2 3
J5  1 2 3
J6  1 2 3
# Section 3: patch definitions from bounding
  curves

P1  1 4 2 5    # curve numbers, counter
   clockwise
P2  1 5 2 6
P3  2 4 3 5
P4  2 5 3 6
```

APPARATUS AND METHOD FOR CAPTURING THE EXPRESSION OF A PERFORMER

BACKGROUND OF THE INVENTION

1. Field of the Invention

This invention relates generally to the field of motion capture. More particularly, the invention relates to an improved apparatus and method for tracking and capturing the motion and/or expression of a performer.

2. Description of the Related Art

"Motion capture" refers generally to the tracking and recording of human motion. Motion capture systems are used for a variety of applications including, for example, video games and computer-generated movies. In a typical motion capture session, the motion of a "performer" is captured and translated to a computer-generated character.

As illustrated in FIG. 1, in a motion capture system, a plurality of motion tracking markers 101-116 are attached at various points on a performer's body. The points are selected based on the known limitations of the human skeleton. For example, markers 107 and 114, attached to the performer's knees, represent pivot points for markers 115 and 116, attached to the performer's feet. Similarly, markers 104 and 111, attached to the performer's elbows, represent pivot points for sensors 105 and 112, attached to the performer's hands.

Different types of motion capture systems have been developed over the years. For example, in a "magnetic" motion capture system, the motion markers attached to the performer are active devices that measure their position in a magnetic field enveloping the performer. By contrast, in an optical motion capture system, such as that illustrated in FIG. 1, the motion markers 101-116 are comprised of retro-reflective material, i.e., a material which reflects light back in the direction from which it came, ideally over a wide range of angles of incidence. Two or more cameras 120, 121, 122 are positioned to capture the light reflected off of the retro-reflective markers 101-116.

A motion tracking unit 150 coupled to the cameras is programmed with the relative position of each of the markers 101-116 and the known limitations of the performer's body. For example, if the relationship between motion sensor 107 and 115 is programmed into the motion tracking unit 150, the motion tracking unit 150 will understand that sensor 107 and 115 are always a fixed distance apart, and that sensor 115 may move 107 within a specified range. These constraints allow the motion capture system to usually be able to identify each marker distinctly from the other and thereby know which part of the body each marker's position is identifying. The markers don't actually identify any body parts, strictly their own position and indentity. Also, once the markers are identified individually, the motion capture system is able to determine the position of the markers 101-116 via triangulation between multiple cameras (at least 2) that see the same marker. Using this information and the visual data provided from the cameras 120-122, the motion tracking unit 150 generates artificial motion data representing the movement of the performer during the motion capture session.

A graphics processing unit 152 renders an animated representation of the performer on a computer display 160 (or similar display device) using the motion data. For example, the graphics processing unit 152 may apply the captured motion of the performer to different animated characters and/ or to include the animated characters in different computer-generated scenes. In one implementation, the motion tracking unit 150 and the graphics processing unit 152 are programmable cards coupled to the bus of a computer (e.g., such as the PCI and AGP buses found in many personal computers). One well known company which produces motion capture systems is Motion Analysis Corporation (see, e.g., www.motionanalysis.com).

One problem which exists with current motion capture systems, however, is that when the markers move out of range of the cameras, the motion tracking unit 150 may lose track of the markers. For example, if a performer lays down on the floor on his/her stomach (thereby covering a number of markers), moves around on the floor and then stands back up, the motion tracking unit 150 may not be capable of re-identifying all of the markers.

As such, after a performance, a significant amount of "clean up" is typically required during which computer programmers or animators manually identify each of the "lost" markers to the image tracking unit 150, resulting in significant additional production costs.

In addition, while current motion capture systems are well suited for tracking full body motion, current systems are ill-equipped for tracking the more detailed, expressive movement of a human face. For example, the size of the markers used in current systems allows for only a limited number of markers to be placed on a performer's face, and movement around the performer's lips and eyes, which are small but critical in expression, may be lost by the use of a limited number of markers.

Accordingly, what is needed is an improved apparatus and method for tracking and capturing the motion and/or expression of a performer.

SUMMARY

A method is described comprising: applying a series of curves on specified regions of a performer's face; tracking the movement of the series of curves during a motion capture session; and generating motion data representing the movement of the performer's face using the tracked movement of the series of curves.

BRIEF DESCRIPTION OF THE DRAWINGS

A better understanding of the present invention can be obtained from the following detailed description in conjunction with the drawings, in which.

DETAILED DESCRIPTION OF PREFERRED EMBODIMENTS

Described below is an improved apparatus and method for capturing still images and video on a data processing device. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Embodiments of the Invention

Color-Coded Motion Capture

Figure 1:
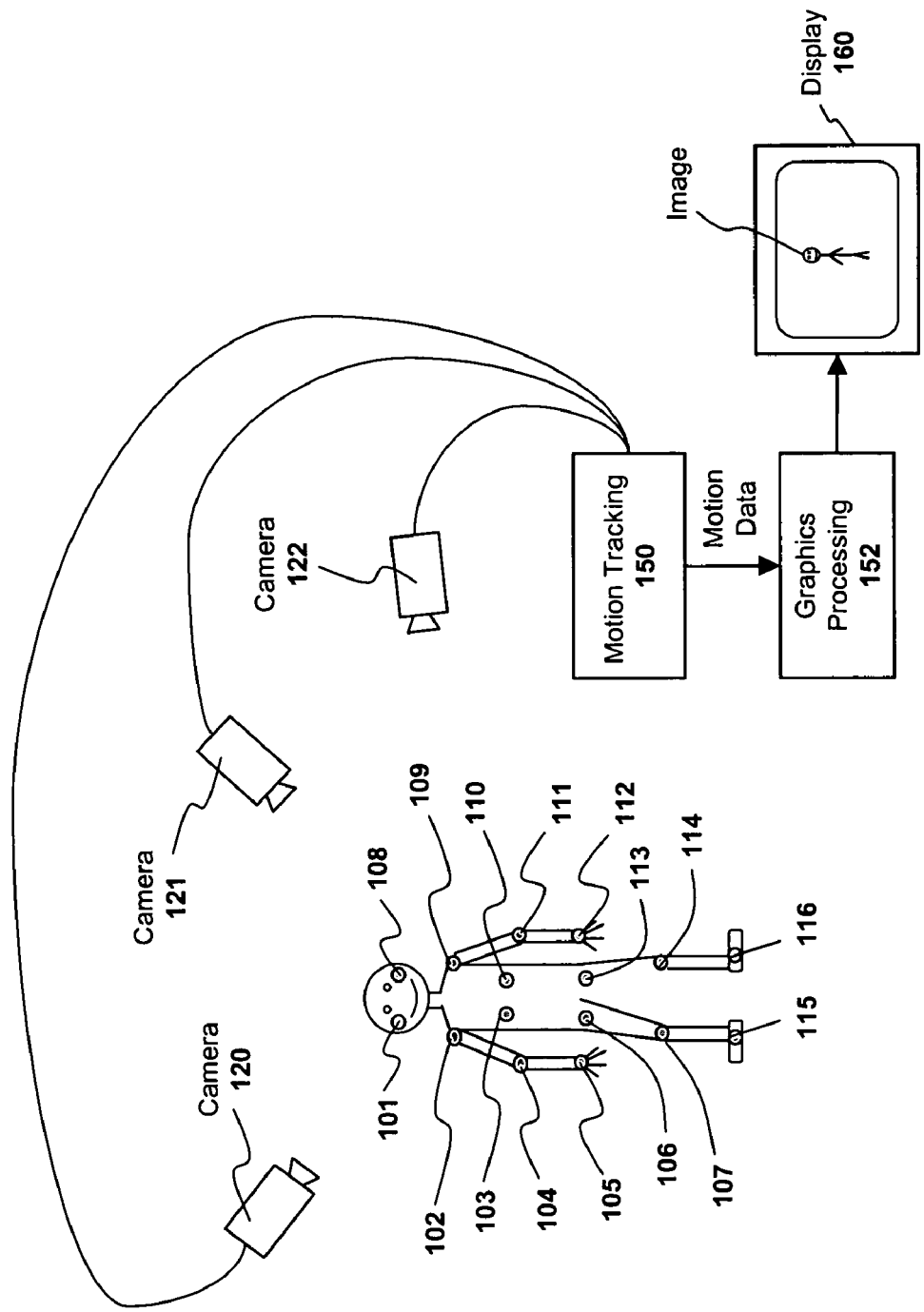
FIG. 1 illustrates a prior art motion tracking system for tracking the motion of a performer using retro-reflective markers and cameras.
Figure 2:
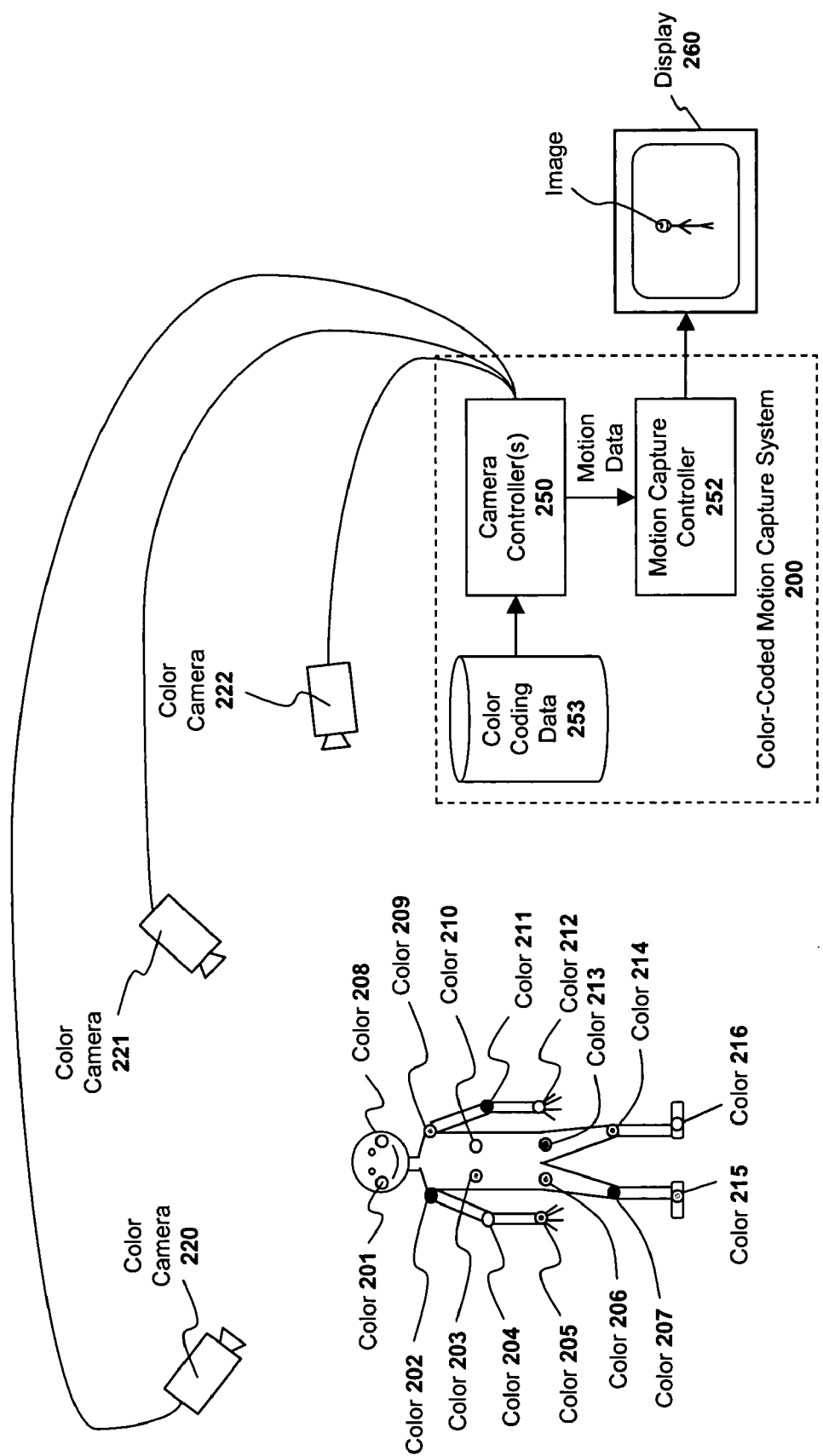
FIG. 2 illustrates one embodiment of the invention which employs color coded retro-reflective markers to improve tracking performance.

FIG. 2 illustrates one embodiment of the invention which tracks the motion of a performer more precisely than prior motion capture systems. As in prior systems, a plurality of retro-reflective markers 201-216 are positioned at various points of the performer's body. Unlike prior systems, however, color coding is applied to the retro-reflective markers 201-216 to enable more effective tracking of the markers. Specifically, as a result of the color coding, each element 201-216 reflects light of different colors (i.e., different frequencies). The different colors may then be used to uniquely identify each individual retro-reflective element.

In the exemplary embodiment, the motion capture system comprises at least one camera controller 250, a motion capture controller 252 and color coding data 253 of the retro-reflective markers 201-216. In one embodiment, each camera 220-222 may itself include a camera controller (i.e., in lieu, or in addition to the camera controller 250 included within the motion capture system 200). In another embodiment, the camera controller may be included within the motion capture controller 252.

Figure 3:
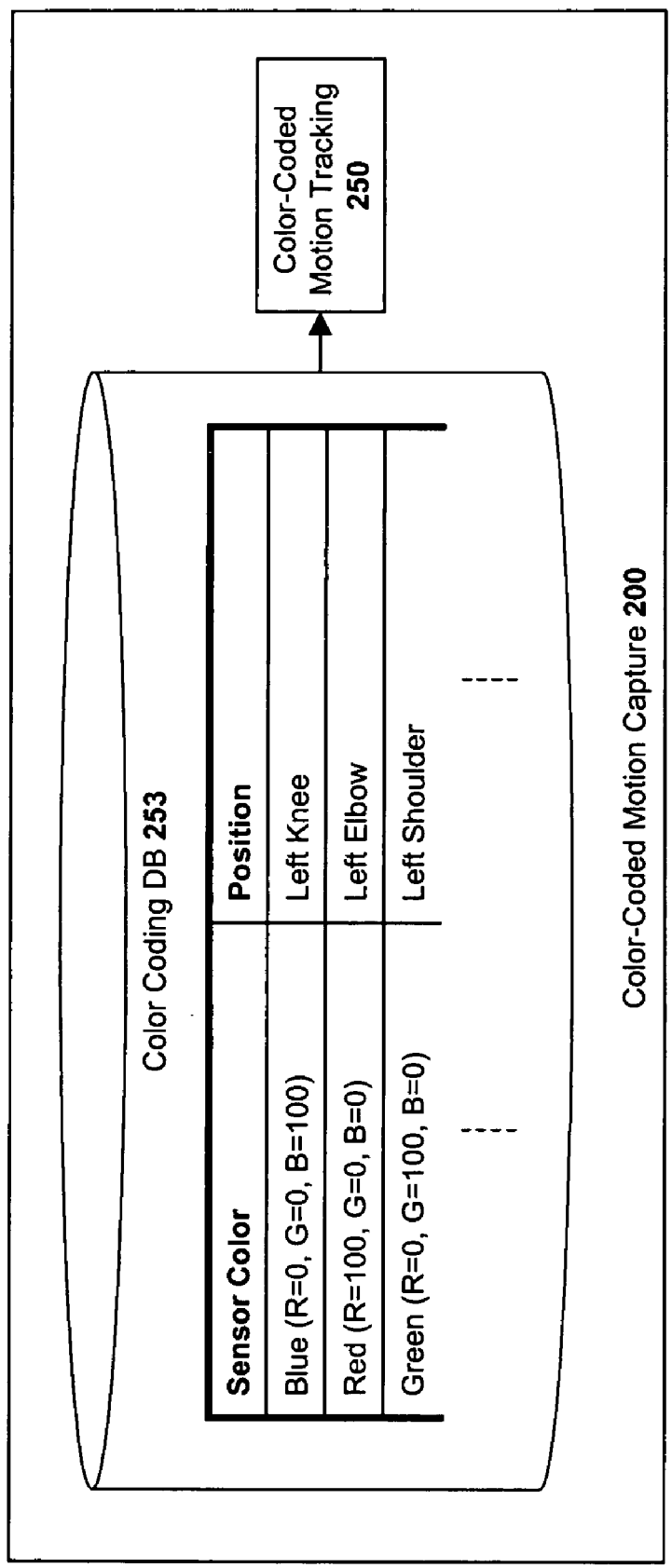
FIG. 3 illustrates a portion of a color-coded database employed in one embodiment of the invention.

Each camera controller 250 is provided with color coding data 253 identifying the respective colors of each of the retro-reflective markers 201-216. The color coding data 253 may be stored within a database on the motion capture system 200 (along with the position of each of the markers 201-216 on the performer's body and/or the physical relationship between each of the markers). An exemplary portion of the database is illustrated in FIG. 3 which shows how a different color may be associated with the position of each retro-reflective element 201-216 on the performer's body (e.g., the color blue is associated with the element on the performer's left knee). As indicated in FIG. 3, the colors may be represented by different levels of red ("R"), green ("G") and blue ("B"). However, various different color coding schemes may be employed while still complying with the underlying principles of the invention.

Using the designated color coding scheme, the camera controller 250 uniquely identifies each individual retro-reflective element. As such, when a group of markers 201-216 move out of range of the cameras, the camera controller 250 no longer needs to rely on the physical relationship between the markers to identify the markers when they move back in range (as in current motion capture systems). Rather, if a particular color is reflected from an element, the camera controller 250 immediately knows which element the light emanated from based on the color coding scheme. The end result is that the "clean up" process is significantly reduced, or eliminated altogether, resulting in significantly reduced production costs.

In one embodiment, the number of colors used is less than the total number of retro-reflective markers 201-216. That is, the same color (or similar colors) may be used for two or more retro-reflective markers 201-216. Accordingly, to distinguish between markers of the same (or similar) colors, the camera controller 250 may also factor in the physical relationship between each of the markers to improve accuracy as in prior systems. This information may be useful, for example, if a significant number of retro-reflective markers are used, resulting in colors which are too similar to accurately differentiate. In addition, from a practical standpoint, it may be easier to work with retro-reflective markers of a limited number of colors. Given that the camera controller 250 may be programmed with the relationship between each of the retro-reflective markers 201-216, a color-coding scheme of even a few colors will improve accuracy significantly.

In one embodiment, each of the plurality of cameras 220-222 supports a resolution of 640×480 pixels at 100 frames per second and video is captured in the form of a stream of bitmap images. However, any video format may be employed while still complying with the underlying principles of the invention. In one embodiment, the cameras are coupled to the camera controller 250 via an IEEE-1394 ("FireWire") port such as an IEEE-1394A ("FireWire A") port. Alternatively, the cameras may be coupled via IEEE-1394B ("FireWire B"), Universal Serial Bus 2.0 ("USB 2.0"), or an IEEE-802.11 wireless channel. It should be noted, however, that the underlying principles of the present invention are not limited to any particular communication standard.

An exemplary architecture of the camera controller 250 includes a FireWire A bus for each controlled camera 220-222, a processor sufficient to record the video stream from each controlled camera 220-222, Random Access Memory ("RAM") sufficient to capture the video stream from the cameras 220-222, and storage sufficient to store several (e.g., two) hours of captured video per camera 220-222. By way of example, the camera controller 250 may include a 2.4 GHz Intel Pentium® processor, 1 GB of RAM, 3 Serial ATA 200 GB hard drives, and Microsoft Windows XP®. In another embodiment, the camera controller 250 and the motion capture controller 252 are programmable cards coupled to the bus of a computer (e.g., such as a PCI/AGP bus). However, as described below, the underlying principles of the invention are not limited to any particular hardware or software architecture. The camera controller 250 may also compress the video using one or more digital video compression formats (e.g., MPEG-4, Real Video 8, AVI, . . . etc).

In one embodiment, the cameras 220-222 are frame-synchronized for capturing video. Synchronization may be performed by a separate synchronization unit (not shown) communicatively connected to each camera 220-222. Alternatively, synchronization may be performed through FireWire (e.g., with each FireWire bus providing a synchronization signal to each camera). By frame-synchronizing the cameras, the data captured by each camera will be at roughly the same moment in time. So, if the performer (and the markers attached to the performer) is in the process of a rapid motion, there will be less discrepancy between the measurements made by each camera in a given frame time of each marker, and more accurate position in space will be measured when the captured marker positions are triangulated.

In one embodiment, the camera controller 250 is communicatively connected to a motion capture controller 252 through a Category 6 Ethernet cable. Other embodiments of the connection include, but are not limited to, FireWire, USB 2.0, and IEEE 802.11 wireless connection. An exemplary architecture of a motion capture controller comprises a processor and volatile memory sufficient to process collected data from the camera controller 250 and sufficient storage to store the processed data. One specific example of an architecture is a Dual two gigahertz G5 Power Macintosh®, two gigabytes of Random Access Memory ("RAM") and a two hundred gigabyte hard drive. In another embodiment, the camera controller 250 and the motion capture controller 252 are programmable cards coupled to the bus of a computer (e.g., such as a PCI/AGP bus), or may be implemented as software executed on a single computer. However, as described below, the underlying principles of the invention are not limited to any particular hardware or software architecture.

In one embodiment, the motion capture controller 252 uses the motion data captured by the camera controller to generate 3-D motion data representing the motion of the performer during a performance. The 3-D representation may be used, for example, to render a graphical animation of a character on a computer display 260 (or similar display device). By way of example, the motion capture controller 252 may include the animated character in different computer-generated scenes. The motion capture controller 252 may store the 3-D motion data in a file (e.g., a .obj file) which may subsequently used to reconstruct the motion of the performer.

High-Precision Motion Capture

As mentioned above, current motion capture systems lack the precision necessary for capturing low-level, detailed movement. For example, to capture the facial expressions of a performer, current systems rely on the same general techniques as those described above for full body motion, resulting in a "point cloud" (i.e. a locus of points in 3D space) of markers positioned close together on the face of the performer. Because they are positioned so close together, however, it is difficult for current motion capture systems to differentiate each of the markers during a performance, particularly during a dramatic change in the performer's expression (e.g., when the performer suddenly laughs or sneezes).

To improve accuracy, the same general type of color-coding techniques described above may be employed. For example, the "point cloud" may be comprised of color-coded retro-reflective markers, each of which may be uniquely identified by a motion tracking unit 250 based on color and/or relative position.

Another problem with current motion capture systems is that the number of markers on the face is limited. Thus, not enough points for sensitive and critical movements (e.g., movement around the mouth and eyes) exist in order to make a faithful recreation of the performer's face.

A further problem is that markers on the face can interfere with the performer's performance or with its capture. For example, markers on the lips may get in the way of natural lip motion in speech, or if an expression results in a lip being curled into the mouth, a marker may become completely obscured from all the motion capture cameras.

To solve the foregoing problems, in one embodiment of the invention, a series of reflective curves are painted on the performer's face and the displacement of the series of curves is tracked over time. By analyzing curves instead of discrete data points, the system is able to generate significantly more surface data than traditional marker-based tracking systems. Although a series of reflective "curves" are painted on the performer's face in the embodiments of the invention described below, the underlying principles of the invention may also be implemented using a variety of other types of facial markings (e.g., using a grid of horizontal and vertical lines deformed over the performers face).

Figure 4:
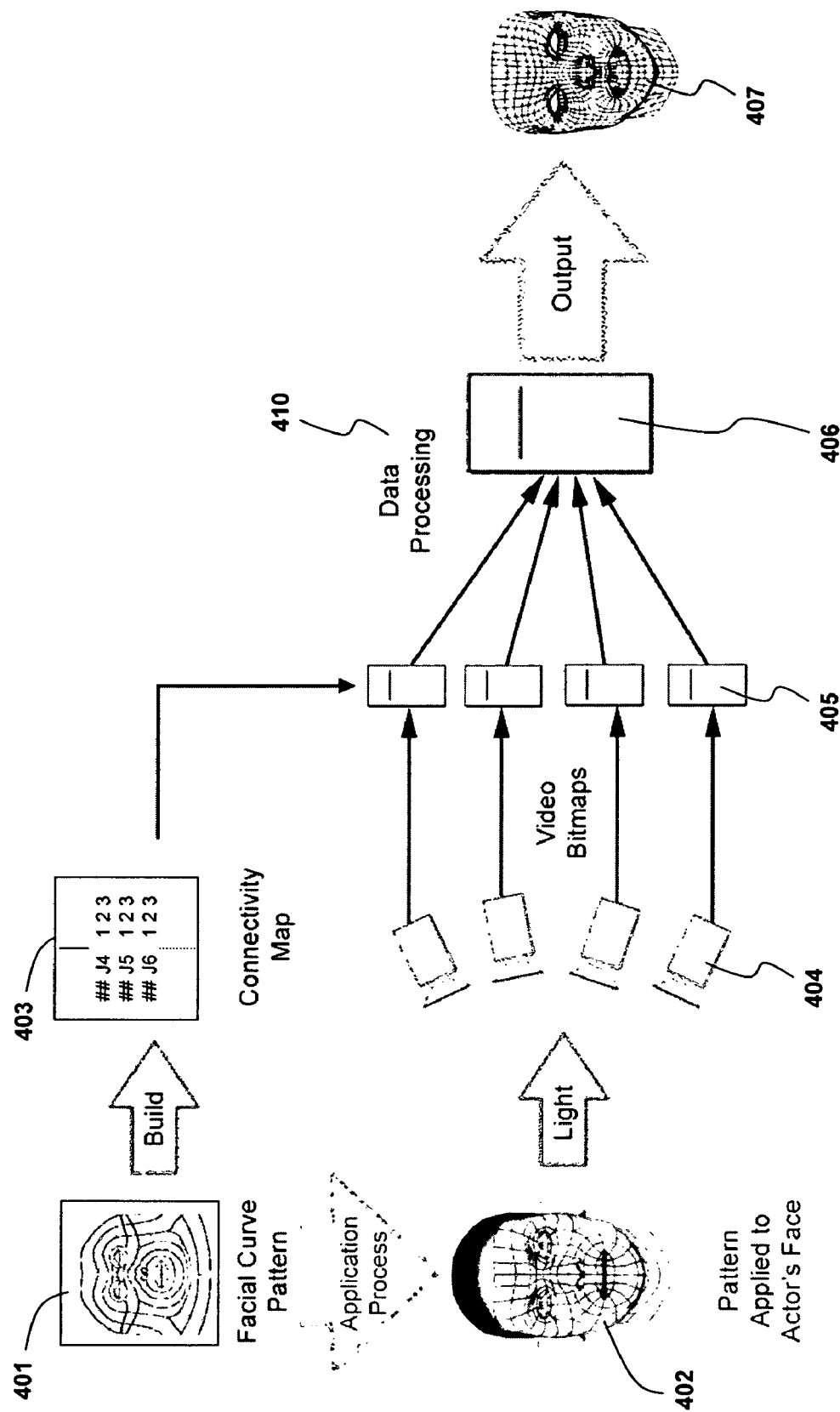
FIG. 4 illustrates a method for tracking a performer's facial expressions according to one embodiment of the invention.

FIG. 4 illustrates one embodiment of a motion tracking system for performing the foregoing operations. In this embodiment, a predefined facial curve pattern 401 is adjusted to fit the topology of each performer's face 402. In one embodiment, the three-dimensional (3-D) curve pattern is adjusted based on a 3-D map of the topology of the performer's face captured using a 3-D scanning system. The scan may be performed, for example, using a 3-D scanning system such as those available from Cyberware® (e.g., using the Cyberware® Color 3-D Scanner, Model 3030RGB/PS). A unique facial curve pattern 401 may then be created using the scanned 3-D facial topology. In one embodiment, the performer will be asked to provide a "neutral" expression during the scanning process.

Figure 5A:
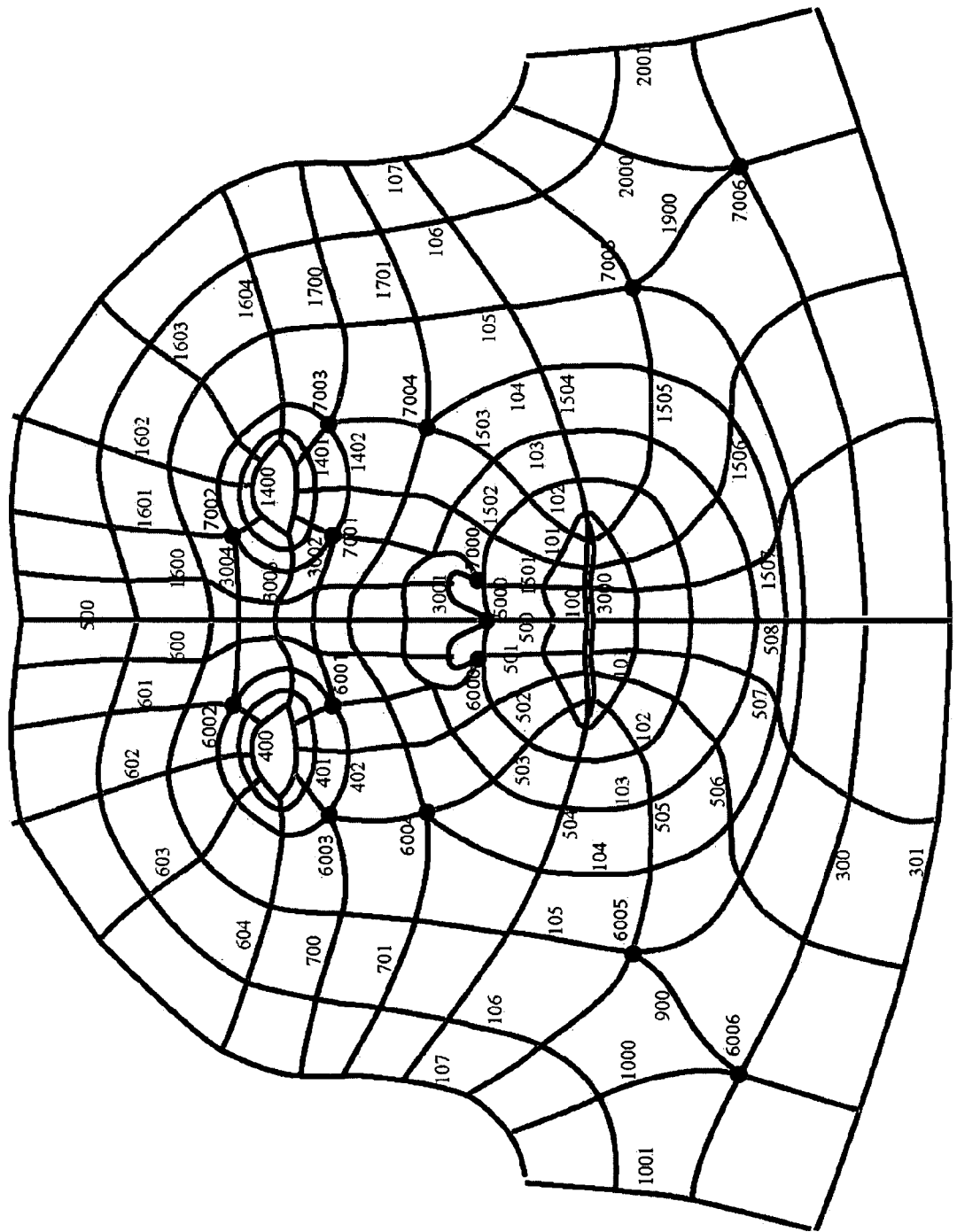
FIGS. 5a-b illustrates an exemplary curve pattern employed in one embodiment of the invention.
Figure 5B:
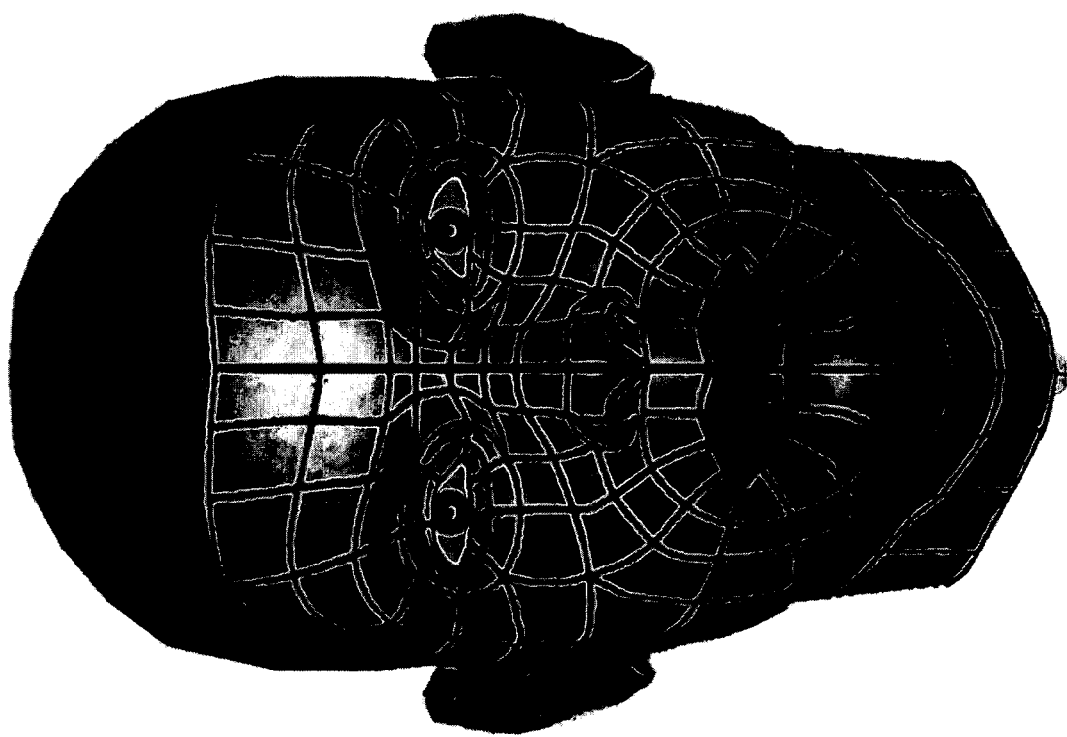

In one embodiment, the curves defined by the curve pattern 401 are painted on the face of the performer using retro-reflective, non-toxic paint or theatrical makeup with colors corresponding to the colors shown in FIGS. 5a-b. In another embodiment the performer's face is first painted with a solid contrasting color (e.g. black) to the lines that are subsequently painted. In yet another embodiment, paints that glow under special illumination (e.g. so-called "black lights") are used so as to be distinctly delineated when so illuminated. In one embodiment, to accurately apply the curve pattern, a physical 3-D mask is created with slits/holes corresponding to the curves defined by the curve pattern. The 3-D mask may then be placed over the face of the performer to apply the paint. In one embodiment, the 3-D mask is generated by providing the scanned topology of the user's face to a 3-D printer.

Rather than printing a custom mask to apply the set of curves, a preexisting mask may be used. Features of the mask may be aligned and stretched to features of the performer (e.g., the nose holes of the mask fit over the nose holes of the performer, the mouth area of the mask fits over the mouth of the performer, the eye holes of the mask fit over the eye sockets of the performer, etc). In an alternate embodiment, a projection (e.g., a projection of light) onto the performer's face may serve as a guide for painting the curve pattern.

In an alternate embodiment, the 3-D curve pattern may be manually adjusted to the face of the performer (e.g., by a makeup artist). Once a particular curve pattern is selected, curves may be placed on a given performer in the same locations each time they are applied using, for example, a projector or a stencil.

FIG. 5a illustrates an exemplary curve pattern, flattened into a 2D image, and FIG. 5b illustrates the curve pattern applied to an exemplary performer's face in 3D. The curve pattern is designed to meet the visual requirements of the optical capture system while still representing a configuration of surface patches and/or polygons that lends itself to good quality facial deformation. In areas of high deformation, short lines with many intersections help achieve higher resolution. In areas of low deformation, long lines with few intersections may suffice.

As indicated in FIG. 5a, in one embodiment, each curve has a unique identifying name and/or number (to support systematic data processing) and a color that can be easily identified by the optical capture system. Three different curve colors are associated with three different possible facial curve types:

(1) "Contours" generally form concentric loops around the mouth and eyes. Contours are colored red in FIGS. 5a-b (e.g., lines 100-107; 300-301; 400-402; and 1400-1402).

(2) "Radials" generally issue outward from the mouth and eyes in spoke-like patterns. Radials are colored green in FIGS. 5a-b (e.g., lines 500-508; 600-604; 1000-1001; 1500-1507; 1600-1604; and 2000-2001).

(3) "Transition" curves are neither clearly contours or radials. Transition curves are colored blue in FIGS. 5*a-b* (e.g., lines 700-701; 900; 1700-1701; 1900; and 3002-3004).

In one embodiment, no curve can intersect another curve of the same color (or type). Another defined property of the curve pattern is that each polygon and/or surface patch created by the curves must be a quadrilateral. The above list of properties is not necessarily exhaustive, and all of the above listed properties do not need to be followed in generating the curve pattern 401.

Once the curve pattern is applied, in one embodiment, the curve pattern is tracked by a motion capture processing system 410 comprised of one or more camera controllers 405 and a central motion capture controller 406 during the course of a performance. In one embodiment, each of the camera controllers 405 and central motion capture controller 406 is implemented using a separate computer system. Alternatively, the camera controllers and motion capture controller may be implemented as software executed on a single computer system or as any combination of hardware and software.

In one embodiment, each of the camera controllers 405 and/or the motion capture controller 406 is programmed with data 403 representing the curve pattern 401. The motion capture system 410 uses this information to trace the movement of each curve within the curve pattern during a performance. For example, the performer's facial expressions provided by each of the cameras 404 (e.g., as bitmap images) are analyzed and the curves identified using the defined curve pattern.

Figure 6:
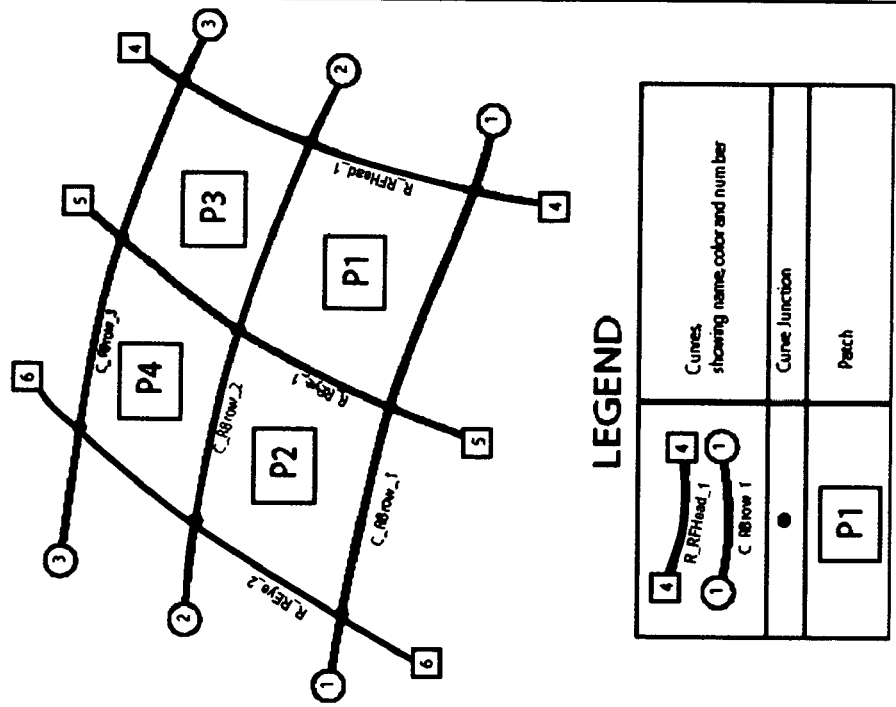
FIG. 6 illustrates a connectivity map employed in one embodiment of the invention.

In one embodiment, the curve data 403 is provided to the motion capture system in the form of a "connectivity map," an example of which is illustrated in FIG. 6. The connectivity map is a text file representation of the curve pattern 401 which includes a list of all curves in the pattern and a list of all surface patches in the pattern, with each patch defined by its bounding curves. It is used by the camera controllers 405 and/or the central motion capture controller 406 to identify curves and intersections in the optically captured data. This, in turn, allows point data from the curves to be organized into surface patches and ultimately the triangulated mesh of a final 3-D geometry 407.

In one embodiment, the connectivity map includes the following four sections:

(1) A single command to set the level of subdivision for all curves (identified as "Section 0" in FIG. 6). This determines how many polygonal faces will be created between intersections along each curve.

(2) A list of all curves organized by type (contour, radial or transition), with each curve having a unique name and/or number and a color that match the curve type (identified as "Section 1" in FIG. 6).

(3) For each curve, an ordered list of other curves that it intersects along its length (identified as "Section 2" in FIG. 6).

(4) A list of all surface patches, each defined by the curves that make up its sides (identified as "Section 3" in FIG. 6).

In one embodiment, the connectivity map is stored as an extended .obj file (such as the .obj files supported by certain 3D modeling software packages, such as Maya, by Alias Systems Corp.), with the section data described above appearing as comments. Alternatively, the connectivity map may be stored as an .obj file without the extensions referred to in the previous sentence.

In one embodiment, the motion capture system 410 performs multiple levels of motion capture processing. Each camera controller is responsible for capturing video provided from one or more cameras 404, storing it to disk, and performing the first portion of the motion capture processing under the control of the motion capture controller 406. In one embodiment, a single command from the motion capture controller 406 may be generated to instruct all camera controllers to start or stop a capture session, thereby allowing for frame-synchronized captures when combined with an external synchronization trigger.

Once a capture is initiated, each camera controller 405 captures video streams and stores the streams to a storage device (e.g., a hard drive) for subsequently processing. In one embodiment, the streams are stored in an Audio Video Interleave ("AVI") format, although various other formats may be used.

In one embodiment, each camera controller performs the following operations for each frame of captured AVI video. First, each of the images are visually optimized and cleaned so that curves may be easily identified apart from background noise. In one embodiment, the contrast is increased between any background images/noise and the curve pattern. In addition, color balance adjustments may be applied so that the relative balances of red, green and blue are accurate. Various other image processing techniques may be applied to the image prior to identifying each of the curves.

After the images are processed, the curves are mathematically located from within the images. The intersection points of each of the curves are also located. The mesh definition in the connectivity map is then used to identify the curves in each of the images. In one embodiment, this is accomplished by correlating the captured images with the curve data provided in the connectivity map. Once the curves and intersection points are identified, curve data is quantized into line segments to support the final desired polygonal resolution. The resulting intersection points of the lines are then used as the vertices of planar triangles that make up the output geometric mesh.

Figure 8:
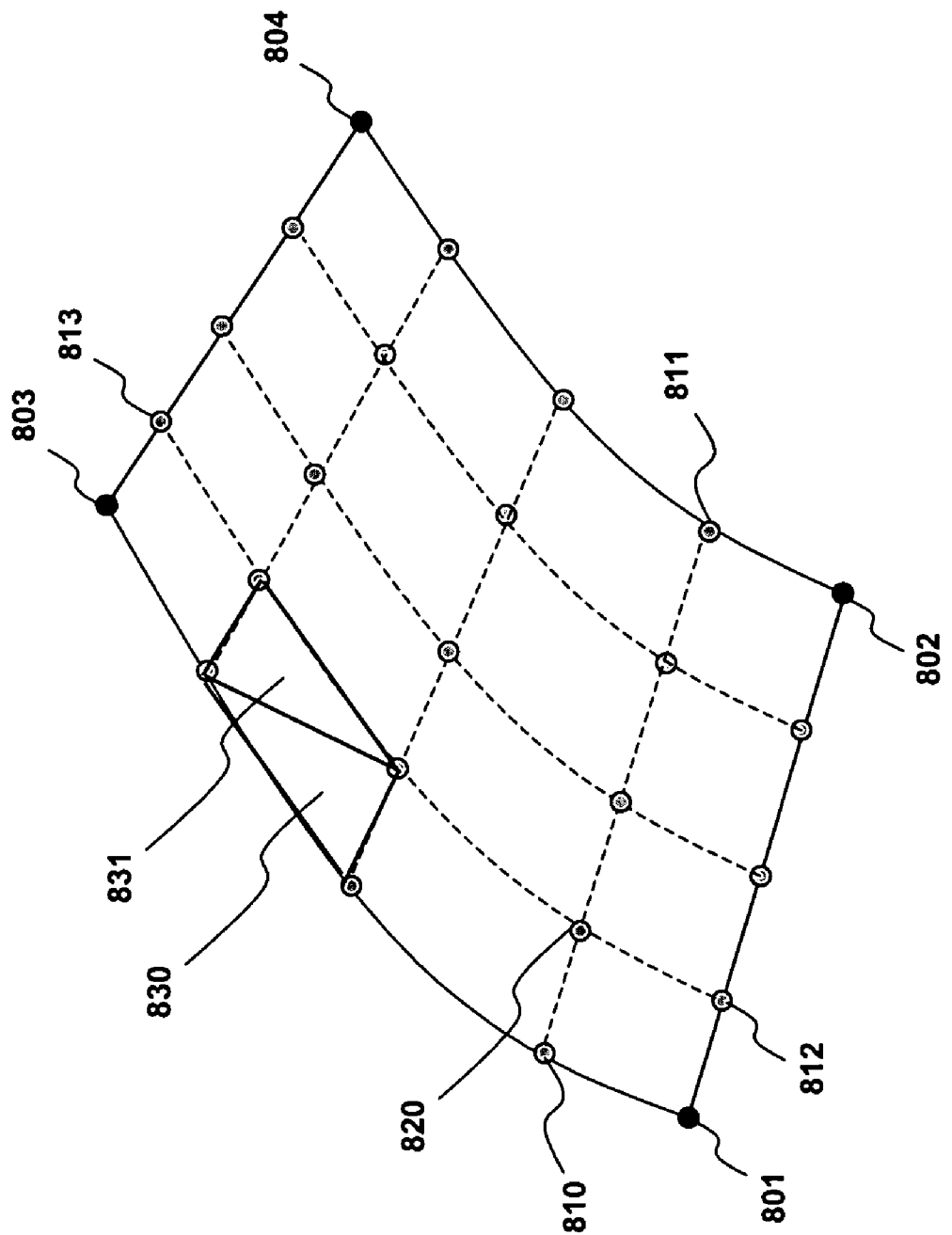
FIG. 8 illustrates extrapolation of points within a surface patch used in one embodiment of the invention.

By way of example, FIG. 8 illustrates a surface patch defined by four intersection points 801-804. In one embodiment, to quantize the curve data into line segments, a series of points are identified along each of the curves, such as point 810 on the curve defined by intersection points 801 and 803; point 811 on the curve defined by intersection points 802 and 804; point 812 on the curve defined by intersection points 801 and 802; and point 813 on the curve defined by intersection points 803 and 804. In the example shown in FIG. 8, three points are identified on each of the curves. It should be noted, however, that more or fewer points may be identified on each curve while still complying with the underlying principles of the invention (e.g., depending on the desired resolution of the system).

To extrapolate points within the surface patch, In one embodiment, once the points on each of the curves are identified, they are logically interconnected to form lines which intersect one another, as illustrated in FIG. 8. The intersection points of each of the lines are identified (e.g., point 820) and all of the points are used to define the vertices of a series of adjacent triangles within the surface patch (a technique referred to as "tessellation"). Two such triangles, 830 and 831, are identified in FIG. 8.

The data collected in the foregoing manner is stored in a 2-D curve file. Each camera controller generates a separate 2-D curve file containing 2-D data collected from the unique perspective of its camera. In one embodiment, the 2-D curve file is an .obj file (e.g., with all Z coordinates set to zero). However, the underlying principles of the invention are not limited to any particular file format.

The 2-D curve files are provided to the central motion capture controller 406 which uses the data within the 2-D curve files to generate a 3-D representation of each of the curves and vertices. That is, using the location of the 2-D curves and vertices provided from different perspectives, the central motion capture controller generates full 3-D data (i.e., including Z values), for each of the curves/vertices. In one embodiment, central motion capture controller stores the 3-D data within a single .obj file. Once again, however, various alternate file formats may be used.

The end result is a single geometric mesh definition per frame of capture. This geometric mesh is a close approximation of the surface of the face at each frame of capture, and when viewed in succession, the sequence of meshes provide a close approximation of the motion of the face. In one embodiment, in order to maintain texture coordinates on face geometry throughout an animation sequence, only a single reference frame is used to generate the 3D mesh. All subsequent motion frames will then use the location information of the points of each curve to reposition the vertices of the face model.

Figure 9:
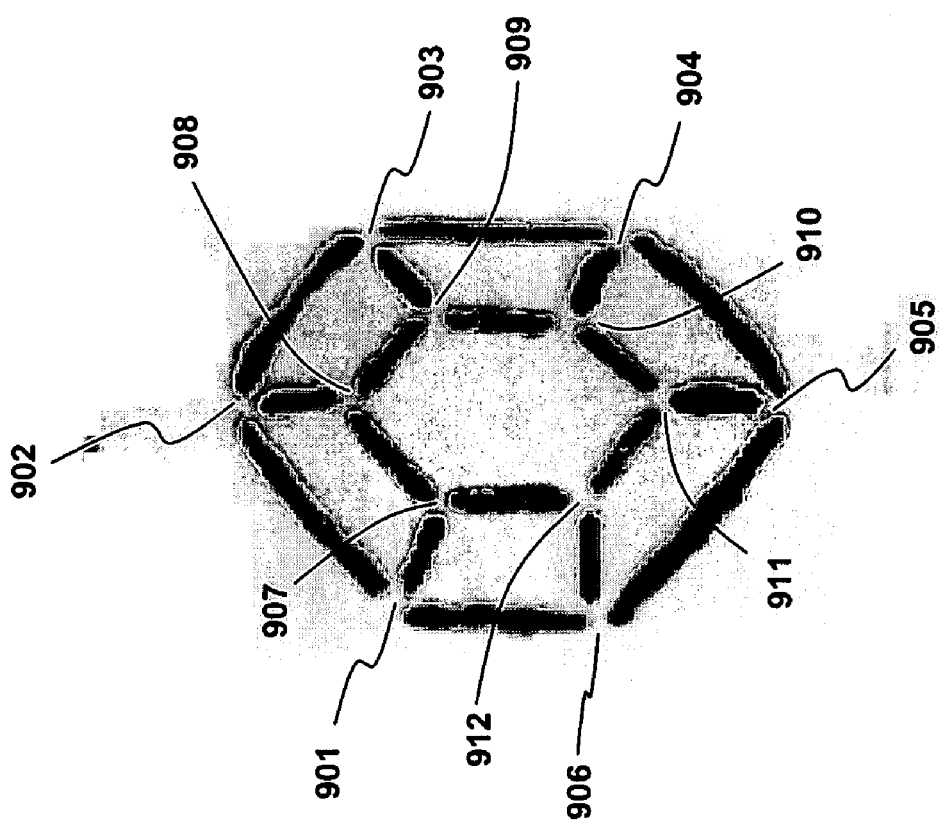
FIG. 9 illustrates an exemplary series of curves captured and analyzed by the embodiments of the invention described herein.

An exemplary curve pattern captured in an AVI frame is illustrated in FIG. 9. A 2-D .obj representation of the curve pattern and a 3-D .obj representation of the curve pattern, collected using the techniques described above, is provided in the appendix at the end of this detailed description.

Those of ordinary skill in the art will readily understand the data contained within each of the sections of the 2-D and 3-D .obj files. Briefly, starting with the 2-D curve data, the "Nodes" section identifies the 12 primary vertices 901-912 where the various curves shown in FIG. 9 intersect. The "Segments" section identifies points on the line segments connecting each of the 12 primary vertices. In the example, three points on each line segment are identified. The "Patches" section identifies the extrapolated points within each patch (i.e., extrapolated from the three points on each line segment as described above) followed by "face" data (f) which identifies the 3 vertices for each triangle within the patch.

The 3-D data (which follows the 2-D data in the appendix) provides the 3-D coordinates for each point (v), and "face" data (f) identifying three vertices for each triangle in the 3-D mesh.

The following is an exemplary hardware platform which may be used for each camera controller:
- A FireWire Rev. A port to couple each camera controller to each camera it controls.
- An RJ45 1000Base-T Gigabit Ethernet port for communication with the central motion capture controller.
- A Processor sufficient to record the video stream (e.g., a 2.4 GHZ Pentium processor)
- Random access memory or other high-speed memory sufficient to capture each video stream (e.g., 1GB Double-Data Rate Synchronous Dynamic RAM)
- An OS that maximizes the performance characteristics of the system (e.g., Windows XP).
- Permanent storage sufficient to store two or more hours of captured video per camera controlled. At a rate of 30 MB/sec, each camera controller may be equipped with 120 GB of storage space per camera. A SCSI or ATA RAID controller may be used to keep up with the demands of capturing from one or more cameras. In another embodiment, 3× 200 GB Serial ATA drives are used.

The foregoing details are provided merely for the purpose of illustration. The underlying principles of the invention are not limited to any particular hardware or software platform. For example, as mentioned above, each of the camera controllers may be implemented as software executed within a single computer system.

In one embodiment, the motion capture controller 406 is implemented on a dual 2 GHZ G5 Macintosh with 2 GB of RAM and a 200 GB mass storage device. However, the motion capture controller 406 is not limited to any particular hardware configuration.

As mentioned above, in one embodiment, each camera 404 supports a resolution of 640×480 at 100 frames per second, global shutter, and five cameras are used to provide complete coverage of the face and head of the performer. FireWire-based color cameras utilizing C-mount lenses are employed in one embodiment of the invention. The FireWire connection provides both a data interface and power to each camera. In one embodiment, the cameras are running at 100 fps or faster. Resolution may vary, but initial cameras will provide 640× 480 sub-pixel resolution, utilizing a 2×2 RGGB mosaic image sensor.

In one embodiment, the focus of the camera lenses extend to a 4' cube volume of space to allow the actor some freedom of movement while the capture takes place. Currently, the minimum focus distance used is 5'; the maximum is 9'; and the target distance is 7.' A 16 mm lens with a ⅔" image sensor provides an approximately 30 degree angle of view and sufficient depth of field to cover the target area.

In one embodiment, each camera captures video at the same time. Each 1394 bus has its own synchronization signal and all cameras on that bus will sync to it automatically. However, given that there will likely be variance between the timing among 1394 busses; each 1394 bus may be synced with each other. An external synchronization device may also be used to synchronize and trigger the cameras.

Direct source lighting is sometimes problematic because lines that don't directly face the source are significantly darker. Thus, one embodiment of the invention will utilize dispersed ambient lighting to equalize the return of light between all lines.

Figure 7:
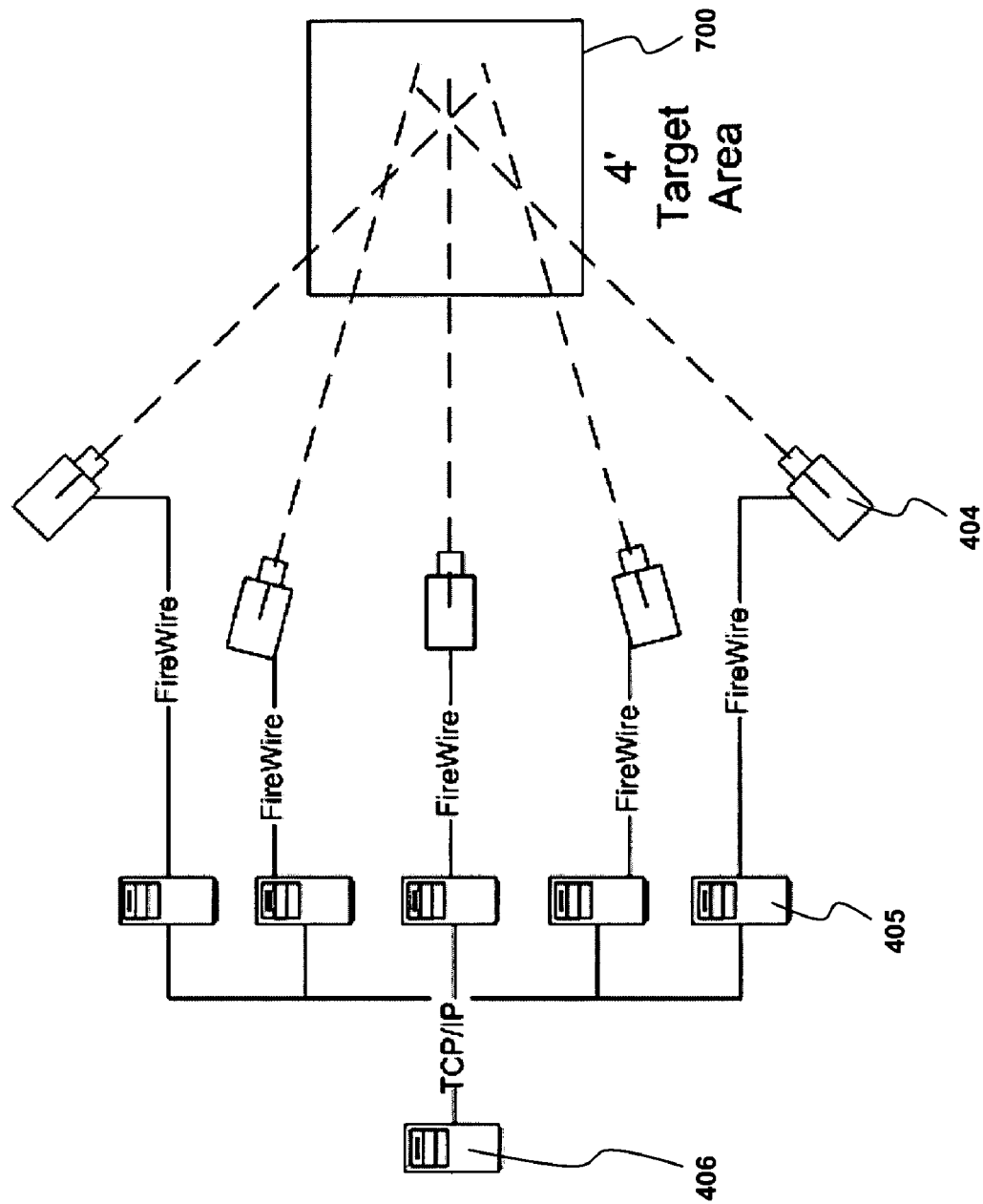
FIG. 7 illustrates a camera arrangement in which a plurality of cameras are focused on a specified volume of space.

FIG. 7 illustrates one embodiment of a system layout in which five cameras 404 are focused on a 4' cube volume of space 700. The cameras of this embodiment are positioned approximately 7' from the target area of the capture. The cameras are varied along the Z-axis to provide maximum coverage of the target area (where the Z-axis points out of the performer's face towards the camera). Indirect ambient lighting surrounds the target area and produces an even contrast level around the entire capture surface.

Embodiments of the invention may include various steps as set forth above. The steps may be embodied in machine-executable instructions which cause a general-purpose or special-purpose processor to perform certain steps. Various elements which are not relevant to the underlying principles of the invention such as computer memory, hard drive, input devices, have been left out of the figures to avoid obscuring the pertinent aspects of the invention.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, while the embodiments of the invention set forth above employ an .obj representation of the 2-D and 3-D data, various other file types may be used while still complying with the underlying principles of the invention.

Accordingly, the scope and spirit of the present invention should be judged in terms of the claims which follow.

APPENDIX

```
2-D Curve .OBJ File:
#      QCap 2d intermediate file
#      configuration :        6PatchTest/Configs/Capture3anim.cfg
#      camera config :        6PatchTest/Configs/Camera3.cfg
#      qbj reference :        6PatchTest/test6Patches.qbj
#      capture avi :          6PatchTest/727Capture/anim/cam3/anim3.avi
#      graph obj :            6PatchTest/Outputs/graph2dcam3anim
#      num divs :             3
#      frame number :         1

#      CamPos         -0.07879126      +5.26676273      +28.06798553
#      Nodes
v      -1.97392690    -1.07431972      +0.00000000      # 1
v      -1.38112295    -1.10586524      +0.00000000      # 2
v      -1.94250190    -0.04210759      +0.00000000      # 3
v      -1.46626675    -0.32032418      +0.00000000      # 4
v      -1.01778662    +0.78737569      +0.00000000      # 5
v      -0.90682340    +0.16821600      +0.00000000      # 6
v      +0.09229846    +0.20500717      +0.00000000      # 7
v      -0.46925020    -0.26685110      +0.00000000      # 8
v      +0.12524356    -1.21420789      +0.00000000      # 9
v      -0.50753808    -0.98335826      +0.00000000      # 10
v      -0.90752012    -2.08183002      +0.00000000      # 11
v      -0.93476307    -1.40090668      +0.00000000      # 12
#      Segments
#      ref node 1 to 2
v      -1.88817441    -1.07677734      +0.00000000      # 13
v      -1.73365057    -1.08120596      +0.00000000      # 14
v      -1.57832527    -1.09207094      +0.00000000      # 15
#      ref node 1 to 3
v      -2.02279949    -0.91511810      +0.00000000      # 16
v      -2.01127958    -0.56780803      +0.00000000      # 17
v      -2.01818895    -0.18221754      +0.00000000      # 18
#      ref node 1 to 11
v      -1.89252400    -1.33948851      +0.00000000      # 19
v      -1.53722715    -1.72880912      +0.00000000      # 20
v      -1.14227486    -2.06838703      +0.00000000      # 21
#      ref node 2 to 4
v      -1.46942806    -0.88874239      +0.00000000      # 22
v      -1.47398293    -0.64232862      +0.00000000      # 23
v      -1.48249972    -0.40496421      +0.00000000      # 24
#      ref node 2 to 12
v      -1.35785246    -1.16308212      +0.00000000      # 25
v      -1.19748890    -1.28624499      +0.00000000      # 26
v      -1.05077696    -1.41390395      +0.00000000      # 27
#      ref node 3 to 4
v      -1.87016106    -0.08351994      +0.00000000      # 28
v      -1.73302794    -0.16202335      +0.00000000      # 29
v      -1.60396945    -0.23860896      +0.00000000      # 30
#      ref node 3 to 5
v      -1.82844138    +0.16903846      +0.00000000      # 31
v      -1.54463696    +0.48444188      +0.00000000      # 32
v      -1.22927189    +0.76298791      +0.00000000      # 33
#      ref node 4 to 6
v      -1.43346179    -0.14927626      +0.00000000      # 34
v      -1.26640391    +0.02475371      +0.00000000      # 35
v      -1.10597372    +0.18744487      +0.00000000      # 36
#      ref node 5 to 6
v      -0.99989671    +0.69490540      +0.00000000      # 37
v      -0.96908879    +0.53566402      +0.00000000      # 38
v      -0.94003153    +0.36418778      +0.00000000      # 39
#      ref node 5 to 7
v      -0.79045194    +0.81359112      +0.00000000      # 40
v      -0.38208273    +0.60620642      +0.00000000      # 41
v      +0.01468797    +0.35845342      +0.00000000      # 42
#      ref node 6 to 8
v      -0.86345023    +0.16402812      +0.00000000      # 43
v      -0.69971013    +0.04638975      +0.00000000      # 44
```

APPENDIX-continued

| | | | | |
|---|---|---|---|---|
| v | −0.52908832 | −0.08177856 | +0.00000000 | # 45 |
| # | ref node 7 to 8 | | | |
| v | −0.03782166 | +0.10093655 | +0.00000000 | # 46 |
| v | −0.18275049 | −0.01497812 | +0.00000000 | # 47 |
| v | −0.31062376 | −0.12739645 | +0.00000000 | # 48 |
| # | ref node 7 to 9 | | | |
| v | +0.19888037 | −0.00571947 | +0.00000000 | # 49 |
| v | +0.19490257 | −0.44645983 | +0.00000000 | # 50 |
| v | +0.20095029 | −0.96389931 | +0.00000000 | # 51 |
| # | ref node 8 to 10 | | | |
| v | −0.44282863 | −0.34857011 | +0.00000000 | # 52 |
| v | −0.44731554 | −0.58253217 | +0.00000000 | # 53 |
| v | −0.45390007 | −0.81122655 | +0.00000000 | # 54 |
| # | ref node 9 to 10 | | | |
| v | +0.02093080 | −1.16445100 | +0.00000000 | # 55 |
| v | −0.14491892 | −1.08534122 | +0.00000000 | # 56 |
| v | −0.31961635 | −1.03620934 | +0.00000000 | # 57 |
| # | ref node 9 to 11 | | | |
| v | +0.05893474 | −1.43344414 | +0.00000000 | # 58 |
| v | −0.29023099 | −1.77611458 | +0.00000000 | # 59 |
| v | −0.68079162 | −2.09481359 | +0.00000000 | # 60 |
| # | ref node 10 to 12 | | | |
| v | −0.53929967 | −1.08528543 | +0.00000000 | # 61 |
| v | −0.66158485 | −1.22676969 | +0.00000000 | # 62 |
| v | −0.80080003 | −1.38589847 | +0.00000000 | # 63 |
| # | ref node 11 to 12 | | | |
| v | −0.90017086 | −1.98392475 | +0.00000000 | # 64 |
| v | −0.88597983 | −1.79487479 | +0.00000000 | # 65 |
| v | −0.90703517 | −1.62483418 | +0.00000000 | # 66 |
| # | Patches | | | |
| # | patch (ref 1 2 4 3) (found 9 8 6 4) | | | |
| v | −1.94201326 | −0.90960985 | +0.00000000 | # 67 |
| v | −1.79448068 | −0.89957356 | +0.00000000 | # 68 |
| v | −1.64789939 | −0.89466411 | +0.00000000 | # 69 |
| v | −1.93168771 | −0.57751322 | +0.00000000 | # 70 |
| v | −1.78445733 | −0.59549576 | +0.00000000 | # 71 |
| v | −1.64114118 | −0.61708033 | +0.00000000 | # 72 |
| v | −1.93770528 | −0.21450090 | +0.00000000 | # 73 |
| v | −1.78696704 | −0.27498978 | +0.00000000 | # 74 |
| v | −1.64308548 | −0.33638209 | +0.00000000 | # 75 |
| f | 1 | 13 | 67 | |
| f | 67 | 16 | 1 | |
| f | 13 | 14 | 68 | |
| f | 68 | 67 | 13 | |
| f | 14 | 15 | 69 | |
| f | 69 | 68 | 14 | |
| f | 15 | 2 | 22 | |
| f | 22 | 69 | 15 | |
| f | 16 | 67 | 70 | |
| f | 70 | 17 | 16 | |
| f | 67 | 68 | 71 | |
| f | 71 | 70 | 67 | |
| f | 68 | 69 | 72 | |
| f | 72 | 71 | 68 | |
| f | 69 | 22 | 23 | |
| f | 23 | 72 | 69 | |
| f | 17 | 70 | 73 | |
| f | 73 | 18 | 17 | |
| f | 70 | 71 | 74 | |
| f | 74 | 73 | 70 | |
| f | 71 | 72 | 75 | |
| f | 75 | 74 | 71 | |
| f | 72 | 23 | 24 | |
| f | 24 | 75 | 72 | |
| f | 18 | 73 | 28 | |
| f | 28 | 3 | 18 | |
| f | 73 | 74 | 29 | |
| f | 29 | 28 | 73 | |
| f | 74 | 75 | 30 | |
| f | 30 | 29 | 74 | |
| f | 75 | 24 | 4 | |
| f | 4 | 30 | 75 | |
| # | end of patch | | | |
| # | patch (ref 3 4 6 5) (found 4 6 2 1) | | | |
| v | −1.76840758 | +0.12164260 | +0.00000000 | # 76 |
| v | −1.65719903 | +0.03382918 | +0.00000000 | # 77 |
| v | −1.54994988 | −0.05393972 | +0.00000000 | # 78 |
| v | −1.50200534 | +0.41576684 | +0.00000000 | # 79 |
| v | −1.42488790 | +0.29150587 | +0.00000000 | # 80 |
| v | −1.34960341 | +0.16479778 | +0.00000000 | # 81 |

APPENDIX-continued

| | | | | | |
|---|---|---|---|---|---|
| v | −1.20968723 | +0.67684817 | +0.00000000 | | # 82 |
| v | −1.17511904 | +0.52474141 | +0.00000000 | | # 83 |
| v | −1.14256370 | +0.36594769 | +0.00000000 | | # 84 |
| f | 3 | 28 | 76 | | |
| f | 76 | 31 | 3 | | |
| f | 28 | 29 | 77 | | |
| f | 77 | 76 | 28 | | |
| f | 29 | 30 | 78 | | |
| f | 78 | 77 | 29 | | |
| f | 30 | 4 | 34 | | |
| f | 34 | 78 | 30 | | |
| f | 31 | 76 | 79 | | |
| f | 79 | 32 | 31 | | |
| f | 76 | 77 | 80 | | |
| f | 80 | 79 | 76 | | |
| f | 77 | 78 | 81 | | |
| f | 81 | 80 | 77 | | |
| f | 78 | 34 | 35 | | |
| f | 35 | 81 | 78 | | |
| f | 32 | 79 | 82 | | |
| f | 82 | 33 | 32 | | |
| f | 79 | 80 | 83 | | |
| f | 83 | 82 | 79 | | |
| f | 80 | 81 | 84 | | |
| f | 84 | 83 | 80 | | |
| f | 81 | 35 | 36 | | |
| f | 36 | 84 | 81 | | |
| f | 33 | 82 | 37 | | |
| f | 37 | 5 | 33 | | |
| f | 82 | 83 | 38 | | |
| f | 38 | 37 | 82 | | |
| f | 83 | 84 | 39 | | |
| f | 39 | 38 | 83 | | |
| f | 84 | 36 | 6 | | |
| f | 6 | 39 | 84 | | |
| # | end of patch | | | | |
| # | patch (ref 5 6 8 7) (found 1 2 5 3) | | | | |
| v | −0.80268133 | +0.70376182 | +0.00000000 | | # 85 |
| v | −0.82067740 | +0.53699791 | +0.00000000 | | # 86 |
| v | −0.84048349 | +0.36466652 | +0.00000000 | | # 87 |
| v | −0.44288766 | +0.50127840 | +0.00000000 | | # 88 |
| v | −0.52472460 | +0.35871845 | +0.00000000 | | # 89 |
| v | −0.60477138 | +0.21596235 | +0.00000000 | | # 90 |
| v | −0.09987094 | +0.26895592 | +0.00000000 | | # 91 |
| v | −0.23970987 | +0.15907945 | +0.00000000 | | # 92 |
| v | −0.37051862 | +0.05026680 | +0.00000000 | | # 93 |
| f | 5 | 37 | 85 | | |
| f | 85 | 40 | 5 | | |
| f | 37 | 38 | 86 | | |
| f | 86 | 85 | 37 | | |
| f | 38 | 39 | 87 | | |
| f | 87 | 86 | 38 | | |
| f | 39 | 6 | 43 | | |
| f | 43 | 87 | 39 | | |
| f | 40 | 85 | 88 | | |
| f | 88 | 41 | 40 | | |
| f | 85 | 86 | 89 | | |
| f | 89 | 88 | 85 | | |
| f | 86 | 87 | 90 | | |
| f | 90 | 89 | 86 | | |
| f | 87 | 43 | 44 | | |
| f | 44 | 90 | 87 | | |
| f | 41 | 88 | 91 | | |
| f | 91 | 42 | 41 | | |
| f | 88 | 89 | 92 | | |
| f | 92 | 91 | 88 | | |
| f | 89 | 90 | 93 | | |
| f | 93 | 92 | 89 | | |
| f | 90 | 44 | 45 | | |
| f | 45 | 93 | 90 | | |
| f | 42 | 91 | 46 | | |
| f | 46 | 7 | 42 | | |
| f | 91 | 92 | 47 | | |
| f | 47 | 46 | 91 | | |
| f | 92 | 93 | 48 | | |
| f | 48 | 47 | 92 | | |
| f | 93 | 45 | 8 | | |
| f | 8 | 48 | 93 | | |
| # | end of patch | | | | |
| # | patch (ref 7 8 10 9) (found 3 5 7 10) | | | | |

APPENDIX-continued

| | | | | |
|---|---:|---:|---:|---|
| v | +0.05936889 | −0.07349060 | +0.00000000 | # 94 |
| v | −0.10973242 | −0.15469839 | +0.00000000 | # 95 |
| v | −0.26144481 | −0.24316306 | +0.00000000 | # 96 |
| v | +0.06564914 | −0.46652544 | +0.00000000 | # 97 |
| v | −0.10495630 | −0.49191234 | +0.00000000 | # 98 |
| v | −0.26400471 | −0.53418404 | +0.00000000 | # 99 |
| v | +0.08196294 | −0.92675823 | +0.00000000 | # 100 |
| v | −0.08961675 | −0.87226200 | +0.00000000 | # 101 |
| v | −0.26208374 | −0.84349310 | +0.00000000 | # 102 |
| f | 7 | 46 | 94 | |
| f | 94 | 49 | 7 | |
| f | 46 | 47 | 95 | |
| f | 95 | 94 | 46 | |
| f | 47 | 48 | 96 | |
| f | 96 | 95 | 47 | |
| f | 48 | 8 | 52 | |
| f | 52 | 96 | 48 | |
| f | 49 | 94 | 97 | |
| f | 97 | 50 | 49 | |
| f | 94 | 95 | 98 | |
| f | 98 | 97 | 94 | |
| f | 95 | 96 | 99 | |
| f | 99 | 98 | 95 | |
| f | 96 | 52 | 53 | |
| f | 53 | 99 | 96 | |
| f | 50 | 97 | 100 | |
| f | 100 | 51 | 50 | |
| f | 97 | 98 | 101 | |
| f | 101 | 100 | 97 | |
| f | 98 | 99 | 102 | |
| f | 102 | 101 | 98 | |
| f | 99 | 53 | 54 | |
| f | 54 | 102 | 99 | |
| f | 51 | 100 | 55 | |
| f | 55 | 9 | 51 | |
| f | 100 | 101 | 56 | |
| f | 56 | 55 | 100 | |
| f | 101 | 102 | 57 | |
| f | 57 | 56 | 101 | |
| f | 102 | 54 | 10 | |
| f | 10 | 57 | 102 | |
| # | end of patch | | | |
| # | patch (ref 9 10 12 11) (found 10 7 12 11) | | | |
| v | −0.03340572 | −1.36659396 | +0.00000000 | # 103 |
| v | −0.18702959 | −1.25521636 | +0.00000000 | # 104 |
| v | −0.35217524 | −1.17552054 | +0.00000000 | # 105 |
| v | −0.33949929 | −1.68379068 | +0.00000000 | # 106 |
| v | −0.42534745 | −1.52255034 | +0.00000000 | # 107 |
| v | −0.53308535 | −1.38759983 | +0.00000000 | # 108 |
| v | −0.68712240 | −1.98646998 | +0.00000000 | # 109 |
| v | −0.69858575 | −1.78775406 | +0.00000000 | # 110 |
| v | −0.74391729 | −1.60941589 | +0.00000000 | # 111 |
| f | 9 | 55 | 103 | |
| f | 103 | 58 | 9 | |
| f | 55 | 56 | 104 | |
| f | 104 | 103 | 55 | |
| f | 56 | 57 | 105 | |
| f | 105 | 104 | 56 | |
| f | 57 | 10 | 61 | |
| f | 61 | 105 | 57 | |
| f | 58 | 103 | 106 | |
| f | 106 | 59 | 58 | |
| f | 103 | 104 | 107 | |
| f | 107 | 106 | 103 | |
| f | 104 | 105 | 108 | |
| f | 108 | 107 | 104 | |
| f | 105 | 61 | 62 | |
| f | 62 | 108 | 105 | |
| f | 59 | 106 | 109 | |
| f | 109 | 60 | 59 | |
| f | 106 | 107 | 110 | |
| f | 110 | 109 | 106 | |
| f | 107 | 108 | 111 | |
| f | 111 | 110 | 107 | |
| f | 108 | 62 | 63 | |
| f | 63 | 111 | 108 | |
| f | 60 | 109 | 64 | |
| f | 64 | 11 | 60 | |
| f | 109 | 110 | 65 | |
| f | 65 | 64 | 109 | |

APPENDIX-continued

```
f  110           111          66
f   66            65         110
f  111            63          12
f   12            66         111
#     end of patch
#     patch (ref 11 12 2 1) (found 11 12 8 9)
v    −1.12161958   −1.97554851   +0.00000000   # 112
v    −1.08208680   −1.79934120   +0.00000000   # 113
v    −1.06843603   −1.63210869   +0.00000000   # 114
v    −1.48550296   −1.66737521   +0.00000000   # 115
v    −1.38869011   −1.55295002   +0.00000000   # 116
v    −1.30523658   −1.43666792   +0.00000000   # 117
v    −1.81520140   −1.31485069   +0.00000000   # 118
v    −1.67330658   −1.26992464   +0.00000000   # 119
v    −1.53499472   −1.22313774   +0.00000000   # 120
f   11            64         112
f  112            21          11
f   64            65         113
f  113           112          64
f   65            66         114
f  114           113          65
f   66            12          27
f   27           114          66
f   21           112         115
f  115            20          21
f  112           113         116
f  116           115         112
f  113           114         117
f  117           116         113
f  114            27          26
f   26           117         114
f   20           115         118
f  118            19          20
f  115           116         119
f  119           118         115
f  116           117         120
f  120           119         116
f  117            26          25
f   25           120         117
f   19           118          13
f   13             1          19
f  118           119          14
f   14            13         118
f  119           120          15
f   15            14         119
f  120            25           2
f    2            15         120
#     end of patch
3-D Curve .OBJ File:
#     QCap 3d output file
v    −2.85527713   −0.03221592    −8419.06712138   # 1
v    −0.14224246   −0.01534742     −486.89139080   # 2
v    −2.62345009   −0.01762889    −8530.84375664   # 3
v    −0.23255046   −0.00190729     −922.55685018   # 4
v    −0.01866798   +0.00069954      −61.34703938   # 5
v    −0.00982721   −0.00007092      −34.32393390   # 6
v    −0.00000000   +0.00000003       −0.00040929   # 7
v    −0.00012924   −0.00000162       −0.69155313   # 8
v    +0.00003162   −0.02699671       −0.25688340   # 9
v    −0.00016476   −0.00598800       −0.95836709   # 10
v    −0.00842451   −2.63002279      −20.88180203   # 11
v    −0.01001579   −0.07330902      −15.53092465   # 12
v    −2.01115896   −0.02628853    −5672.71661209   # 13
v    −1.07313199   −0.02219785    −3924.29190026   # 14
v    −0.44514342   −0.01782408    −1753.86040551   # 15
v    −3.41517693   −0.02466901    −9609.40554189   # 16
v    −3.37326454   −0.02043514    −9845.39485197   # 17
v    −3.43472897   −0.02099859   −10161.44458106   # 18
v    −2.03236442   −0.07463509    −6502.32132962   # 19
v    −0.36363304   −0.46971348    −1427.70800497   # 20
v    −0.03501660   −2.49761670      −98.21258141   # 21
v    −0.23503214   −0.00438823     −788.44786431   # 22
v    −0.24203240   −0.00218083     −962.18015297   # 23
v    −0.25496605   −0.00217421    −1049.38634279   # 24
v    −0.12413873   −0.02155250     −366.76451410   # 25
v    −0.05056833   −0.04119963     −126.99065078   # 26
v    −0.02145381   −0.08052446      −51.73002238   # 27
v    −1.88039672   −0.01307629    −6327.78123433   # 28
v    −1.12155807   −0.00909434    −4400.85608913   # 29
v    −0.56634649   −0.00536210    −2594.71590092   # 30
```

APPENDIX-continued

| | | | | |
|---|---|---|---|---|
| v | −1.62107081 | −0.01191306 | −5764.88409138 | # 31 |
| v | −0.41079149 | −0.00469387 | −2280.82000873 | # 32 |
| v | −0.06726505 | +0.00002837 | −266.89035889 | # 33 |
| v | −0.19865805 | −0.00145849 | −705.77779978 | # 34 |
| v | −0.07815112 | −0.00058524 | −283.20306573 | # 35 |
| v | −0.03080266 | −0.00021141 | −102.30732482 | # 36 |
| v | −0.01682194 | +0.00016390 | −56.73622862 | # 37 |
| v | −0.01441297 | −0.00005423 | −47.73177889 | # 38 |
| v | −0.01215826 | −0.00008078 | −39.86332712 | # 39 |
| v | −0.00434614 | +0.00105931 | −22.90726567 | # 40 |
| v | −0.00006641 | +0.00011584 | −0.65094993 | # 41 |
| v | −0.00000005 | +0.00000179 | −0.00207036 | # 42 |
| v | −0.00674721 | −0.00005568 | −26.94709063 | # 43 |
| v | −0.00144630 | −0.00002574 | −12.45557619 | # 44 |
| v | −0.00024749 | −0.00000367 | −1.77636902 | # 45 |
| v | −0.00000012 | −0.00000001 | −0.00345901 | # 46 |
| v | −0.00000251 | −0.00000011 | −0.05193291 | # 47 |
| v | −0.00002016 | −0.00000038 | −0.18241833 | # 48 |
| v | +0.00000000 | −0.00000000 | −0.00002159 | # 49 |
| v | +0.00000010 | −0.00001891 | −0.00078312 | # 50 |
| v | +0.00001753 | −0.00614668 | −0.14239711 | # 51 |
| v | −0.00008403 | −0.00000239 | −0.55814146 | # 52 |
| v | −0.00008506 | −0.00007836 | −0.54528040 | # 53 |
| v | −0.00009877 | −0.00091320 | −0.60508061 | # 54 |
| v | +0.00002711 | −0.02114960 | −0.22083773 | # 55 |
| v | +0.00001004 | −0.01318929 | −0.10110221 | # 56 |
| v | −0.00000932 | −0.00976820 | −0.21216153 | # 57 |
| v | +0.00009276 | −0.09562358 | −0.75384385 | # 58 |
| v | +0.00024612 | −0.62347514 | −2.22389916 | # 59 |
| v | −0.00090188 | −2.73897631 | −7.06516040 | # 60 |
| v | −0.00023790 | −0.01312871 | −1.35721522 | # 61 |
| v | −0.00085836 | −0.02856311 | −4.51073016 | # 62 |
| v | −0.00381511 | −0.06670572 | −14.02032951 | # 63 |
| v | −0.00828948 | −1.85179529 | −20.34411406 | # 64 |
| v | −0.00783671 | −0.66381689 | −20.80194305 | # 65 |
| v | −0.00880770 | −0.24749125 | −17.43733671 | # 66 |
| v | −2.53419271 | −0.01904568 | −7083.31425689 | # 67 |
| v | −1.39365898 | −0.01317829 | −4600.26935242 | # 68 |
| v | −0.68013621 | −0.00888908 | −2758.99655253 | # 69 |
| v | −2.49214466 | −0.01547562 | −7440.51375781 | # 70 |
| v | −1.37477979 | −0.01006933 | −4813.86728792 | # 71 |
| v | −0.68687306 | −0.00630708 | −2978.84966637 | # 72 |
| v | −2.54307764 | −0.01609799 | −7789.94723278 | # 73 |
| v | −1.39249405 | −0.01025520 | −4962.39409348 | # 74 |
| v | −0.70667953 | −0.00642809 | −3109.89677588 | # 75 |
| v | −1.28677020 | −0.01020176 | −4936.76106444 | # 76 |
| v | −0.77834018 | −0.00725734 | −3511.92005176 | # 77 |
| v | −0.40130071 | −0.00371621 | −1798.32295641 | # 78 |
| v | −0.32988980 | −0.00312686 | −1515.17077348 | # 79 |
| v | −0.20263166 | −0.00190769 | −923.28330745 | # 80 |
| v | −0.12915929 | −0.00110602 | −535.21923286 | # 81 |
| v | −0.05878617 | −0.00025971 | −230.52838388 | # 82 |
| v | −0.04910164 | −0.00031992 | −172.85586576 | # 83 |
| v | −0.03923099 | −0.00029169 | −141.91551275 | # 84 |
| v | −0.00467838 | +0.00027407 | −23.80184244 | # 85 |
| v | −0.00521873 | −0.00000271 | −25.14510237 | # 86 |
| v | −0.00584621 | −0.00005237 | −26.17773299 | # 87 |
| v | −0.00124404 | +0.00003166 | −1.13154307 | # 88 |
| v | −0.00028037 | −0.00000355 | −2.64744933 | # 89 |
| v | −0.00060445 | −0.00001128 | −5.48150737 | # 90 |
| v | −0.00000054 | +0.00000024 | −0.01571355 | # 91 |
| v | −0.00000999 | −0.00000024 | −0.11885048 | # 92 |
| v | −0.00004294 | −0.00000088 | −0.42698580 | # 93 |
| v | −0.00000001 | −0.00000000 | −0.00050427 | # 94 |
| v | −0.00000050 | −0.00000003 | −0.01193154 | # 95 |
| v | −0.00001100 | −0.00000035 | −0.10635566 | # 96 |
| v | +0.00000011 | −0.00002340 | −0.00119929 | # 97 |
| v | −0.00000033 | −0.00003169 | −0.00844615 | # 98 |
| v | −0.00001055 | −0.00004896 | −0.09674927 | # 99 |
| v | +0.00001133 | −0.00420525 | −0.09220026 | # 100 |
| v | +0.00000443 | −0.00215703 | −0.04402449 | # 101 |
| v | −0.00000793 | −0.00144571 | −0.11328230 | # 102 |
| v | +0.00005516 | −0.06620950 | −0.44985113 | # 103 |
| v | +0.00002237 | −0.03543796 | −0.22793116 | # 104 |
| v | −0.00002037 | −0.02281117 | −0.27080849 | # 105 |
| v | +0.00003692 | −0.38805329 | −0.69049081 | # 106 |
| v | −0.00005338 | −0.15727912 | −0.62637565 | # 107 |
| v | −0.00022221 | −0.07233456 | −1.36582291 | # 108 |
| v | −0.00124661 | −1.90076302 | −5.98913556 | # 109 |
| v | −0.00142655 | −0.65008611 | −8.91167313 | # 110 |

APPENDIX-continued

| | | | | | |
|---|---|---|---|---|---|
| v | | −0.00232268 | −0.23364924 | −11.28525589 | # 111 |
| v | | −0.03132206 | −1.74892739 | −89.16884195 | # 112 |
| v | | −0.02696359 | −0.66409792 | −75.33651175 | # 113 |
| v | | −0.02477265 | −0.25774329 | −63.07236653 | # 114 |
| v | | −0.26394852 | −0.33458667 | −1041.68660713 | # 115 |
| v | | −0.15294564 | −0.17435603 | −535.92246871 | # 116 |
| v | | −0.09509394 | −0.09239214 | −276.07382663 | # 117 |
| v | | −1.51148809 | −0.06159783 | −4851.07674779 | # 118 |
| v | | −0.79879554 | −0.04579098 | −3169.24692727 | # 119 |
| v | | −0.35061080 | −0.03157385 | −1267.84849781 | # 120 |
| f | 1 | 13 | 67 | | |
| f | 67 | 16 | 1 | | |
| f | 13 | 14 | 68 | | |
| f | 68 | 67 | 13 | | |
| f | 14 | 15 | 69 | | |
| f | 69 | 68 | 14 | | |
| f | 15 | 2 | 22 | | |
| f | 22 | 69 | 15 | | |
| f | 16 | 67 | 70 | | |
| f | 70 | 17 | 16 | | |
| f | 67 | 68 | 71 | | |
| f | 71 | 70 | 67 | | |
| f | 68 | 69 | 72 | | |
| f | 72 | 71 | 68 | | |
| f | 69 | 22 | 23 | | |
| f | 23 | 72 | 69 | | |
| f | 17 | 70 | 73 | | |
| f | 73 | 18 | 17 | | |
| f | 70 | 71 | 74 | | |
| f | 74 | 73 | 70 | | |
| f | 71 | 72 | 75 | | |
| f | 75 | 74 | 71 | | |
| f | 72 | 23 | 24 | | |
| f | 24 | 75 | 72 | | |
| f | 18 | 73 | 28 | | |
| f | 28 | 3 | 18 | | |
| f | 73 | 74 | 29 | | |
| f | 29 | 28 | 73 | | |
| f | 74 | 75 | 30 | | |
| f | 30 | 29 | 74 | | |
| f | 75 | 24 | 4 | | |
| f | 4 | 30 | 75 | | |
| f | 3 | 28 | 76 | | |
| f | 76 | 31 | 3 | | |
| f | 28 | 29 | 77 | | |
| f | 77 | 76 | 28 | | |
| f | 29 | 30 | 78 | | |
| f | 78 | 77 | 29 | | |
| f | 30 | 4 | 34 | | |
| f | 34 | 78 | 30 | | |
| f | 31 | 76 | 79 | | |
| f | 79 | 32 | 31 | | |
| f | 76 | 77 | 80 | | |
| f | 80 | 79 | 76 | | |
| f | 77 | 78 | 81 | | |
| f | 81 | 80 | 77 | | |
| f | 78 | 34 | 35 | | |
| f | 35 | 81 | 78 | | |
| f | 32 | 79 | 82 | | |
| f | 82 | 33 | 32 | | |
| f | 79 | 80 | 83 | | |
| f | 83 | 82 | 79 | | |
| f | 80 | 81 | 84 | | |
| f | 84 | 83 | 80 | | |
| f | 81 | 35 | 36 | | |
| f | 36 | 84 | 81 | | |
| f | 33 | 82 | 37 | | |
| f | 37 | 5 | 33 | | |
| f | 82 | 83 | 38 | | |
| f | 38 | 37 | 82 | | |
| f | 83 | 84 | 39 | | |
| f | 39 | 38 | 83 | | |
| f | 84 | 36 | 6 | | |
| f | 6 | 39 | 84 | | |
| f | 5 | 37 | 85 | | |
| f | 85 | 40 | 5 | | |
| f | 37 | 38 | 86 | | |
| f | 86 | 85 | 37 | | |
| f | 38 | 39 | 87 | | |
| f | 87 | 86 | 38 | | |

APPENDIX-continued

| | | | |
|---|---|---|---|
| f | 39 | 6 | 43 |
| f | 43 | 87 | 39 |
| f | 40 | 85 | 88 |
| f | 88 | 41 | 40 |
| f | 85 | 86 | 89 |
| f | 89 | 88 | 85 |
| f | 86 | 87 | 90 |
| f | 90 | 89 | 86 |
| f | 87 | 43 | 44 |
| f | 44 | 90 | 87 |
| f | 41 | 88 | 91 |
| f | 91 | 42 | 41 |
| f | 88 | 89 | 92 |
| f | 92 | 91 | 88 |
| f | 89 | 90 | 93 |
| f | 93 | 92 | 89 |
| f | 90 | 44 | 45 |
| f | 45 | 93 | 90 |
| f | 42 | 91 | 46 |
| f | 46 | 7 | 42 |
| f | 91 | 92 | 47 |
| f | 47 | 46 | 91 |
| f | 92 | 93 | 48 |
| f | 48 | 47 | 92 |
| f | 93 | 45 | 8 |
| f | 8 | 48 | 93 |
| f | 7 | 46 | 94 |
| f | 94 | 49 | 7 |
| f | 46 | 47 | 95 |
| f | 95 | 94 | 46 |
| f | 47 | 48 | 96 |
| f | 96 | 95 | 47 |
| f | 48 | 8 | 52 |
| f | 52 | 96 | 48 |
| f | 49 | 94 | 97 |
| f | 97 | 50 | 49 |
| f | 94 | 95 | 98 |
| f | 98 | 97 | 94 |
| f | 95 | 96 | 99 |
| f | 99 | 98 | 95 |
| f | 96 | 52 | 53 |
| f | 53 | 99 | 96 |
| f | 50 | 97 | 100 |
| f | 100 | 51 | 50 |
| f | 97 | 98 | 101 |
| f | 101 | 100 | 97 |
| f | 98 | 99 | 102 |
| f | 102 | 101 | 98 |
| f | 99 | 53 | 54 |
| f | 54 | 102 | 99 |
| f | 51 | 100 | 55 |
| f | 55 | 9 | 51 |
| f | 100 | 101 | 56 |
| f | 56 | 55 | 100 |
| f | 101 | 102 | 57 |
| f | 57 | 56 | 101 |
| f | 102 | 54 | 10 |
| f | 10 | 57 | 102 |
| f | 9 | 55 | 103 |
| f | 103 | 58 | 9 |
| f | 55 | 56 | 104 |
| f | 104 | 103 | 55 |
| f | 56 | 57 | 105 |
| f | 105 | 104 | 56 |
| f | 57 | 10 | 61 |
| f | 61 | 105 | 57 |
| f | 58 | 103 | 106 |
| f | 106 | 59 | 58 |
| f | 103 | 104 | 107 |
| f | 107 | 106 | 103 |
| f | 104 | 105 | 108 |
| f | 108 | 107 | 104 |
| f | 105 | 61 | 62 |
| f | 62 | 108 | 105 |
| f | 59 | 106 | 109 |
| f | 109 | 60 | 59 |
| f | 106 | 107 | 110 |
| f | 110 | 109 | 106 |
| f | 107 | 108 | 111 |
| f | 111 | 110 | 107 |

APPENDIX-continued

| | | | |
|---|---|---|---|
| f | 108 | 62 | 63 |
| f | 63 | 111 | 108 |
| f | 60 | 109 | 64 |
| f | 64 | 11 | 60 |
| f | 109 | 110 | 65 |
| f | 65 | 64 | 109 |
| f | 110 | 111 | 66 |
| f | 66 | 65 | 110 |
| f | 111 | 63 | 12 |
| f | 12 | 66 | 111 |
| f | 11 | 64 | 112 |
| f | 112 | 21 | 11 |
| f | 64 | 65 | 113 |
| f | 113 | 112 | 64 |
| f | 65 | 66 | 114 |
| f | 114 | 113 | 65 |
| f | 66 | 12 | 27 |
| f | 27 | 114 | 66 |
| f | 21 | 112 | 115 |
| f | 115 | 20 | 21 |
| f | 112 | 113 | 116 |
| f | 116 | 115 | 112 |
| f | 113 | 114 | 117 |
| f | 117 | 116 | 113 |
| f | 11 | 427 | 26 |
| f | 26 | 117 | 114 |
| f | 20 | 115 | 118 |
| f | 11 | 819 | 20 |
| f | 115 | 116 | 119 |
| f | 119 | 118 | 115 |
| f | 116 | 117 | 120 |
| f | 120 | 119 | 116 |
| f | 11 | 726 | 25 |
| f | 25 | 120 | 117 |
| f | 19 | 118 | 13 |
| f | 13 | 1 | 19 |
| f | 118 | 119 | 14 |
| f | 14 | 13 | 118 |
| f | 119 | 120 | 15 |
| f | 15 | 14 | 119 |
| f | 120 | 25 | 2 |
| f | 2 | 15 | 120 |

What is claimed is:

1. A method, comprising:

specifying a predefined facial curve pattern comprising a mesh of intersecting curves, wherein each individual curve in the mesh is uniquely identifiable;

applying the predefined facial curve pattern to a performer's face;

storing the predefined facial curve pattern as curve data on a storage device, the curve data usable by a camera controller;

processing sequences of real-time visual images taken of said curves as said curves move during a motion capture session, including, processing visual images taken from regions of the curves residing between intersection points amongst the curves, said processing including correlating each of the captured real-time video images with the curve data read by one or more of the camera controllers to uniquely identify each of the curves, and intersection points between the curves, the operation of processing further comprising:

(i) identifying a first set of positions of the curves, the first set of positions of the curves forming a first set of surface tiles having curved edges; and (ii) identifying a second set of positions of the curves, the second set of positions of the curves forming a second set of surface tiles having curved edges;

generating motion data from the recorded first and second sets of positions of the curves captured in the sequences of real-time visual images, the motion data representing movement of the performer's face during the motion capture session; and storing the motion data on a storage device, the motion data usable to graphically reconstruct movement of the curves during the motion capture session;

wherein a first set of one or more cameras capture a first sequence of real-time video images of a adjusted, predefined facial curve pattern from a first orientation as the performer makes facial movements during a performance and a second set of one or more cameras capture a second sequence of real-time video images of the adjusted, predefined facial curve pattern from a second orientation as the performer makes facial movements during a performance; and wherein specifying the predefined facial curve pattern comprises defining a plurality of curve types and categorizing each of the uniquely identifiable curves as one of the defined curve types, the curve types including contours, radials, and transition curves;

wherein the predefined facial curve pattern is generated such that no curve can intersect another curve of the same curve type.

2. The method of claim 1 wherein said predefined facial curve pattern includes a ring substantially around a feature of said performer's face.

3. The method of claim 2 wherein said pattern further comprises a ring substantially around an eye or mouth of said performer, said ring being intersected at various locations around said ring by one or more different curves.

4. The method of claim 1 wherein said mesh of intersecting curves reside on a nose of said performer.

5. The method as in claim 1 wherein the predefined facial curve pattern defines different colors for one or more of the curves, the different colors usable to distinguish and uniquely identify each of the curves, wherein the curve data indicates a particular color for each of the uniquely identifiable curves, and wherein correlating comprises matching the color of each of the curves captured in the sequences of real-time video images with the color indicated in the curve data.

6. The method as in claim 1 further comprising:
   correlating each of the captured real-time video images from the first orientation and the second orientation with the curve data stored on one or more of the camera controllers to uniquely identify each of the curves and intersection points between the curves from the first orientation and the second orientation;
   generating first motion data representing movement of each of the curves and the intersection points between the curves across the sequences of real-time video images from the first orientation;
   generating second motion data representing movement of each of the curves and the intersection points between the curves across the sequences of real-time video images from the second orientation; and
   storing the first motion data and the second motion data on a storage device, the first and second motion data usable for reconstructing the facial movements of the performer during the performance.

7. The method as in claim 6 further comprising:
   graphically reconstructing movement of the curves during the motion capture session using a combination of the first motion data and the second motion data.

8. The method as in claim 1 wherein the length of each of the line segments is selected based on a desired resolution.

9. The method as in claim 1 wherein quantizing each of the curves into a plurality of line segments comprises:
   identifying a series of points on each of the curves; and
   combining the points to form vertices of a series of adjacent triangles.

10. The method of claim 6 further comprising:
    generating third motion data having a three-dimensional (3D) representation of the motion of the curves and the intersection points between the curves across the sequences of real-time video images, the third motion data being generated using a combination of the first motion data and the second motion data; and
storing the third motion data on a storage device, the third motion data usable for reconstructing 3D facial movements of the performer during the performance.

11. A method for performing motion capture using curves comprising:
    specifying a predefined facial curve pattern comprising a set of intersecting curves, wherein each individual curve in the set is uniquely identifiable;
    adjusting the predefined facial curve pattern based on a topology of a performer's face and applying the adjusted, predefined facial curve pattern to the performer's face;
    storing the adjusted, predefined facial curve pattern on a storage device, the curve data usable by a camera controller;
    tracking the movement of the series of curves of the adjusted, predefined facial curve pattern on the performer's face during a motion capture session by performing the operations of:
      capturing sequences of real-time video images of the adjusted, predefined facial curve pattern as the performer makes facial movements during a performance; and
      correlating each of the captured real-time video images with the curve data read by one or more of the camera controllers to uniquely identify each of the curves and intersection points between the curves;
    generating motion data representing movement of each of the curves and the intersection points between the curves across the sequences of real-time video images; and
    storing the motion data on a storage device, the motion data usable for reconstructing the facial movements of the performer during the performance;
    wherein a first set of one or more cameras capture a first sequence of real-time video images of the adjusted, predefined facial curve pattern from a first orientation as the performer makes facial movements during a performance and a second set of one or more cameras capture a second sequence of real-time video images of the adjusted, predefined facial curve pattern from a second orientation as the performer makes facial movements during a performance;
    wherein generating the predefined facial curve pattern comprises defining a plurality of curve types and categorizing each of the uniquely identifiable curves as one of the defined curve types, the curve types including contours, radials, and transition curves;
    wherein the predefined curve pattern is generated such that no curve can intersect another curve of the same curve type.

12. The method as in claim 11 further comprising:
    correlating each of the captured real-time video images from the first orientation and the second orientation with the curve data stored on one or more of the camera controllers to uniquely identify each of the curves and intersection points between the curves from the first orientation and the second orientation;
    generating first motion data representing movement of each of the curves and the intersection points between the curves across the sequences of real-time video images from the first orientation;
    generating second motion data representing movement of each of the curves and the intersection points between the curves across the sequences of real-time video images from the second orientation; and
    storing the first motion data and the second motion data on a storage device, the first and second motion data usable for reconstructing the facial movements of the performer during the performance.

13. The method as in claim 12 further comprising:
graphically reconstructing movement of the curves during the motion capture session using a combination of the first motion data and the second motion data.

14. The method as in claim 11 wherein the length of each of the line segments is selected based on a desired resolution.

15. The method as in claim 11 wherein quantizing each of the curves into a plurality of line segments comprises:
    identifying a series of points on each of the curves; and
    combining the points to form vertices of a series of adjacent triangles.

16. The method of claim 12 further comprising:

generating third motion data having a three-dimensional (3D) representation of the motion of the curves and the intersection points between the curves across the sequences of real-time video images, the third motion data being generated using a combination of the first motion data and the second motion data; and storing the third motion data on a storage device, the third motion data usable for reconstructing 3D facial movements of the performer during the performance.

17. A method, comprising:

specifying a predefined facial curve pattern comprising a mesh of intersecting curves, wherein each individual curve in the mesh is uniquely identifiable;

applying the predefined facial curve pattern to a performer's face;

storing the predefined facial curve pattern as curve data on a storage device, the curve data usable by a camera controller;

processing sequences of real-time visual images taken of said curves as said curves move during a motion capture session, including, processing visual images taken from regions of the curves residing between intersection points amongst the curves, said processing including correlating each of the captured real-time video images with the curve data read by one or more of the camera controllers to uniquely identify each of the curves, and intersection points between the curves, the operation of processing further comprising:

(i) identifying a first set of positions of the curves, the first set of positions of the curves forming a first set of surface tiles having curved edges; and (ii) identifying a second set of positions of the curves, the second set of positions of the curves forming a second set of surface tiles having curved edges;

generating motion data from the recorded first and second sets of positions of the curves captured in the sequences of real-time visual images, the motion data representing movement of the performer's face during the motion capture session; and storing the motion data on a storage device, the motion data usable to graphically reconstruct movement of the curves during the motion capture session;

wherein a first set of one or more cameras capture a first sequence of real-time video images of a adjusted, predefined facial curve pattern from a first orientation as the performer makes facial movements during a performance and a second set of one or more cameras capture a second sequence of real-time video images of the adjusted, predefined facial curve pattern from a second orientation as the performer makes facial movements during a performance; and wherein specifying the predefined facial curve pattern comprises defining a plurality of curve types and categorizing each of the uniquely identifiable curves as one of the defined curve types, the curve types including contours, radials, and transition curves;

wherein the curve data comprises: a list of curves organized by type, with each curve having a unique identifier associated therewith; for each curve, an ordered list of other curves that it intersects along its length; and a list of surface patches, each defined by the curves that make up its sides.

18. A method, comprising:

specifying a predefined facial curve pattern comprising a mesh of intersecting curves, wherein each individual curve in the mesh is uniquely identifiable;

applying the predefined facial curve pattern to a performer's face;

storing the predefined facial curve pattern as curve data on a storage device, the curve data usable by a camera controller;

processing sequences of real-time visual images taken of said curves as said curves move during a motion capture session, including, processing visual images taken from regions of the curves residing between intersection points amongst the curves, said processing including correlating each of the captured real-time video images with the curve data read by one or more of the camera controllers to uniquely identify each of the curves, and intersection points between the curves, the operation of processing further comprising:

(i) identifying a first set of positions of the curves, the first set of positions of the curves forming a first set of surface tiles having curved edges; and (ii) identifying a second set of positions of the curves, the second set of positions of the curves forming a second set of surface tiles having curved edges;

generating motion data from the recorded first and second sets of positions of the curves captured in the sequences of real-time visual images, the motion data representing movement of the performer's face during the motion capture session; and storing the motion data on a storage device, the motion data usable to graphically reconstruct movement of the curves during the motion capture session;

wherein a first set of one or more cameras capture a first sequence of real-time video images of a adjusted, predefined facial curve pattern from a first orientation as the performer makes facial movements during a performance and a second set of one or more cameras capture a second sequence of real-time video images of the adjusted, predefined facial curve pattern from a second orientation as the performer makes facial movements during a performance; and wherein specifying the predefined facial curve pattern comprises defining a plurality of curve types and categorizing each of the uniquely identifiable curves as one of the defined curve types, the curve types including contours, radials, and transition curves;

wherein generating motion data further comprises: quantizing each of the curves into a plurality of line segments between each of the intersection points; and defining a plurality of triangles using the endpoints of each of the line segments and the intersection points of the curves as vertices of the triangles.

19. A method for performing motion capture using curves comprising:

specifying a predefined facial curve pattern comprising a set of intersecting curves, wherein each individual curve in the set is uniquely identifiable;

adjusting the predefined facial curve pattern based on a topology of a performer's face and applying the adjusted, predefined facial curve pattern to the performer's face;

storing the adjusted, predefined facial curve pattern on a storage device, the curve data usable by a camera controller;

tracking the movement of the series of curves of the adjusted, predefined facial curve pattern on the performer's face during a motion capture session by performing the operations of:

capturing sequences of real-time video images of the adjusted, predefined facial curve pattern as the performer makes facial movements during a performance; and correlating each of the captured real-time video images with the curve data read by one or more of the camera controllers to uniquely identify each of the curves and intersection points between the curves;

generating motion data representing movement of each of the curves and the intersection points between the curves across the sequences of real-time video images; and storing the motion data on a storage device, the motion data usable for reconstructing the facial movements of the performer during the performance;

wherein a first set of one or more cameras capture a first sequence of real-time video images of the adjusted, predefined facial curve pattern from a first orientation as the performer makes facial movements during a performance and a second set of one or more cameras capture a second sequence of real-time video images of the adjusted, predefined facial curve pattern from a second orientation as the performer makes facial movements during a performance;

wherein generating the predefined facial curve pattern comprises defining a plurality of curve types and categorizing each of the uniquely identifiable curves as one of the defined curve types, the curve types including contours, radials, and transition curves;

wherein the predefined facial curve pattern defines different colors for one or more of the curves, the different colors usable to distinguish and uniquely identify each of the curves, wherein the curve data indicates a particular color for each of the uniquely identifiable curves, and wherein correlating comprises matching the color of each of the curves captured in the sequences of real-time video images with the color indicated in the curve data.

20. A method for performing motion capture using curves comprising:

specifying a predefined facial curve pattern comprising a set of intersecting curves, wherein each individual curve in the set is uniquely identifiable;

adjusting the predefined facial curve pattern based on a topology of a performer's face and applying the adjusted, predefined facial curve pattern to the performer's face;

storing the adjusted, predefined facial curve pattern on a storage device, the curve data usable by a camera controller;

tracking the movement of the series of curves of the adjusted, predefined facial curve pattern on the performer's face during a motion capture session by performing the operations of:

capturing sequences of real-time video images of the adjusted, predefined facial curve pattern as the performer makes facial movements during a performance; and correlating each of the captured real-time video images with the curve data read by one or more of the camera controllers to uniquely identify each of the curves and intersection points between the curves;

generating motion data representing movement of each of the curves and the intersection points between the curves across the sequences of real-time video images; and storing the motion data on a storage device, the motion data usable for reconstructing the facial movements of the performer during the performance;

wherein a first set of one or more cameras capture a first sequence of real-time video images of the adjusted, predefined facial curve pattern from a first orientation as the performer makes facial movements during a performance and a second set of one or more cameras capture a second sequence of real-time video images of the adjusted, predefined facial curve pattern from a second orientation as the performer makes facial movements during a performance;

wherein generating the predefined facial curve pattern comprises defining a plurality of curve types and categorizing each of the uniquely identifiable curves as one of the defined curve types, the curve types including contours, radials, and transition curves;

wherein the curve data comprises: a list of curves organized by type, with each curve having a unique identifier associated therewith; for each curve, an ordered list of other curves that it intersects along its length; and a list of surface patches, each defined by the curves that make up its sides.

21. A method for performing motion capture using curves comprising:

specifying a predefined facial curve pattern comprising a set of intersecting curves, wherein each individual curve in the set is uniquely identifiable;

adjusting the predefined facial curve pattern based on a topology of a performer's face and applying the adjusted, predefined facial curve pattern to the performer's face;

storing the adjusted, predefined facial curve pattern on a storage device, the curve data usable by a camera controller;

tracking the movement of the series of curves of the adjusted, predefined facial curve pattern on the performer's face during a motion capture session by performing the operations of:

capturing sequences of real-time video images of the adjusted, predefined facial curve pattern as the performer makes facial movements during a performance; and correlating each of the captured real-time video images with the curve data read by one or more of the camera controllers to uniquely identify each of the curves and intersection points between the curves;

generating motion data representing movement of each of the curves and the intersection points between the curves across the sequences of real-time video images; and storing the motion data on a storage device, the motion data usable for reconstructing the facial movements of the performer during the performance;

wherein a first set of one or more cameras capture a first sequence of real-time video images of the adjusted, predefined facial curve pattern from a first orientation as the performer makes facial movements during a performance and a second set of one or more cameras capture a second sequence of real-time video images of the adjusted, predefined facial curve pattern from a second orientation as the performer makes facial movements during a performance;

wherein generating the predefined facial curve pattern comprises defining a plurality of curve types and categorizing each of the uniquely identifiable curves as one of the defined curve types, the curve types including contours, radials, and transition curves;

quantizing each of the curves into a plurality of line segments between each of the intersection points; and defining a plurality of triangles using the endpoints of each of the line segments and the intersection points of the curves as vertices of the triangles.

* * * * *